United States Patent
Nerubenko et al.

(10) Patent No.: US 10,644,579 B2
(45) Date of Patent: May 5, 2020

(54) VIBRATION ENERGY HARVESTING DAMPER

(71) Applicants: George Nerubenko, Toronto (CA); Cyril Nerubenko, Falun (CA); Lucy Lebedeva, Indian Harbor Beach, FL (US); David Flowers, Indian Harbor Beach, FL (US); Volodymyr Gonchar, Mississauga (CA); Roman Musiala, Toronto (CA); Moshe Michael Haimov, Kleinburg (CA); Dmytriy Gurevych, Maple (CA)

(72) Inventors: George Nerubenko, Toronto (CA); Cyril Nerubenko, Falun (CA); Lucy Lebedeva, Indian Harbor Beach, FL (US); David Flowers, Indian Harbor Beach, FL (US); Volodymyr Gonchar, Mississauga (CA); Roman Musiala, Toronto (CA); Moshe Michael Haimov, Kleinburg (CA); Dmytriy Gurevych, Maple (CA)

( * ) Notice: Subject to any disclaimer, the term of this patent is extended or adjusted under 35 U.S.C. 154(b) by 113 days.

(21) Appl. No.: 16/119,346

(22) Filed: Aug. 31, 2018

(65) Prior Publication Data
US 2020/0076288 A1    Mar. 5, 2020

(51) Int. Cl.
*H02K 35/02* (2006.01)
*F16F 7/104* (2006.01)
(Continued)

(52) U.S. Cl.
CPC ............. *H02K 35/02* (2013.01); *F03G 7/08* (2013.01); *F16F 7/104* (2013.01); *F16F 7/1005* (2013.01);
(Continued)

(58) Field of Classification Search
CPC .. F16F 7/1011; F16F 222/08; F16F 2228/066; F16B 7/1005; H02K 35/02; H02K 33/18
(Continued)

(56) References Cited

U.S. PATENT DOCUMENTS 5,456,341 A * 10/1995 Garnjost ............. B60G 17/018
                                                                  188/378
8,896,139 B2 * 11/2014 McCoy ...................... F03G 7/08
                                                                  290/1 R
(Continued)

OTHER PUBLICATIONS

Cottone, "Energy Harvesting: introduction", NiPS Summer School, 2015.
(Continued)

*Primary Examiner* — Burton S Mullins
(74) *Attorney, Agent, or Firm* — Faegre Drinker Biddle & Reath LLP

(57) ABSTRACT

A vibration energy harvesting damper (VEHD) that is adjustable to a broad range of frequencies of vibration is provided. The VEHD includes a support structure that is securable to a vibrating object, a tuned mass retained by the support structure and movable in a rectilinear direction, a magnet vibrationally coupled to and spaced apart from the tuned mass, a coil surrounding the magnet, and at least one biasing assembly connecting two or more of the support structure, the tuned mass and the magnet. The at least one biasing assembly includes a fixed biasing member and an adjustable biasing member arranged in parallel. The adjustable biasing member is configured to adjust the combined stiffness coefficient of the biasing assembly.

22 Claims, 12 Drawing Sheets

(51) Int. Cl.
*F03G 7/08* (2006.01)
*H02K 5/24* (2006.01)
*F16F 7/10* (2006.01)

(52) U.S. Cl.
CPC ............ *H02K 5/24* (2013.01); *F16F 2222/08* (2013.01); *F16F 2228/066* (2013.01)

(58) Field of Classification Search
USPC ......................................................... 290/1 R
See application file for complete search history.

(56) References Cited

U.S. PATENT DOCUMENTS

| 9,593,733 | B2* | 3/2017 | Hauf ...................... G03F 7/709 |
| 2007/0273074 | A1* | 11/2007 | Mizuno .............. B60G 17/0157 |
| | | | 267/140.15 |

OTHER PUBLICATIONS

Cleante et al., "Energy harvesting from the vibrations of a passing train: effect of speed variability", Journal of Physics, 2016.
S. Boisseau et al., "Electrostatic Conversion for Vibration Energy Harvesting", Intech, 2012.
X. Tang et al., "Simulation and Experiment Validation of Simultaneous Vibration Control and Energy Harvesting from Buildings using Tuned Mass Dampers", American Control Conference, 2011.
B. Lafarge et al., "Modeling of an Electromechanical Energy Harvesting System Integrated in Car Dampers", Research and Innovation for Transport Systems of the Future, Nov. 2012.
C.G. Gregg et al., "Passively Self-Tuning Piezoelectric Energy Harvesting System", Journal of Physics: Conference Series, 2014.
University Transportation Research Center, State University of New York, "Energy Harvesting from Rail Track for Transportation Safety and Monitoring", Feb. 2014.
W. Zhao, University of Nebraska, "Design Optimization of a Linear Generator with Dual Halbach Array for Human Motion Energy Harvesting", Jul. 2015.
X. Niu, University of Illinois, "Modeling and Design Analysis of a Permanent Magnet Linear Synchronous Generator", Technical Report, Aug. 25, 2013.
G. Hu et al., "Performance Analysis of a Magnetorheological Damper with Energy Harvesting Ability", Shock and Vibration, Research Article, May 18, 2016.
S. McGarry et al., "The Potential for Harvesting Energy from the Movement of Trees", Commonwealth Scientific and Industrial Research Organisation (CSIRO), Jul. 23, 2011.
A. Pourghodrat, "Energy Harvesting Systems Design for Railroad Safety", University of Nebraska, Summer 2011.
S. Zhu et al., "Linear Electromagnetic Devices for Vibration Damping and Energy Harvesting: Modeling and Testing", Engineering Structures, vol. 34, 2012.
L. Cannizzaro et al., "Design of an Electromagnetic Regenerative Damper and Energy Harvesting Assessment", Journal of Electromagnetics, vol. 1, 2016.
H. Sun et al., "Seismic Control of a SDOF Structure Through Electromagnetic Resonant Shunt Tuned Mass-Damper-Inerter and the Exact H2 Optimal Solutions", Journal of Vibroengineering, May 2017.
J. Wang et al., "Modeling on Energy Harvesting from a Railway System Using Piezoelectric Transducers", Smart Materials and Structures, 2015.
A. Veprik et al., "Ultra-light Weight Undamped Tuned Dynamic Absorber for Cryogenically Cooled Infrared Electro-optic Payload", Cryogenics 2017.
M.F. Daqaq et al., "Investigation of Power Harvesting via Parametric Excitations", Journal of Intelligent Material Systems and Structures, vol. 20, Mar. 2009.
X. Tang et al., "Enhanced Design of Vibration Energy Harvester Using Dual Masses", Proceedings of the ASME 2011 International Design Engineering Technical Conferences & Computers and Information in Engineering Conferences, Aug. 28-31, 2011.
Q. Wu et al., "The Simulation Analysis of Electromagnetic Repulsion Mechanism for High-voltage Current-Limiting Fuse", Advances in Engineering Research (AER), vol. 107, 2017.
L. Marian, "The tuned mass damper inerter for passive vibration control and energy harvesting in dynamically excited structural systems", University of London, 2016.
S. Boisseau et al., "Adjustable Nonlinear Springs to Improve Efficiency of Vibration Energy Harvesters", Minatec, Grenoble, France, at least as early as Aug. 31, 2018.
Q. Xhang et al., "Vibration Energy Harvesting Based on Magnet and Coil Arrays for Watt-Level Handheld Power Source", IEEE, vol. 102, No. 11, Nov. 2014.
P. Patel, "Development of Electromagnetic Micro-Energy Harvesting Device", University of Waterloo, Canada, 2013.
X. Tang et al., "Self-powered Active Control of Structures with TMDs", Proceeding of the IMAC-XXVIII, Feb. 1-4, 2010.

* cited by examiner

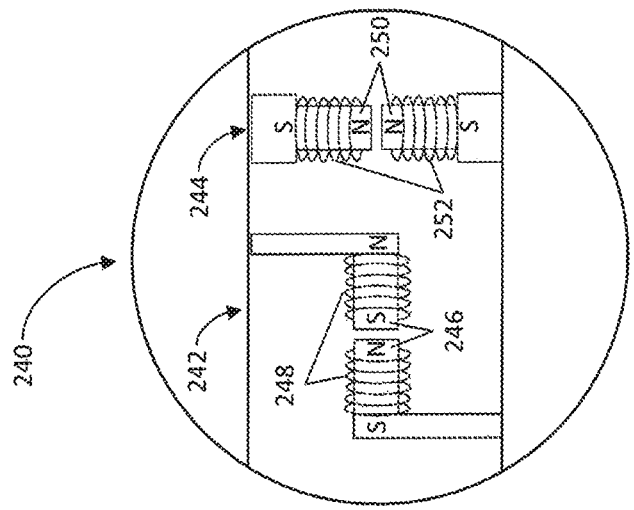
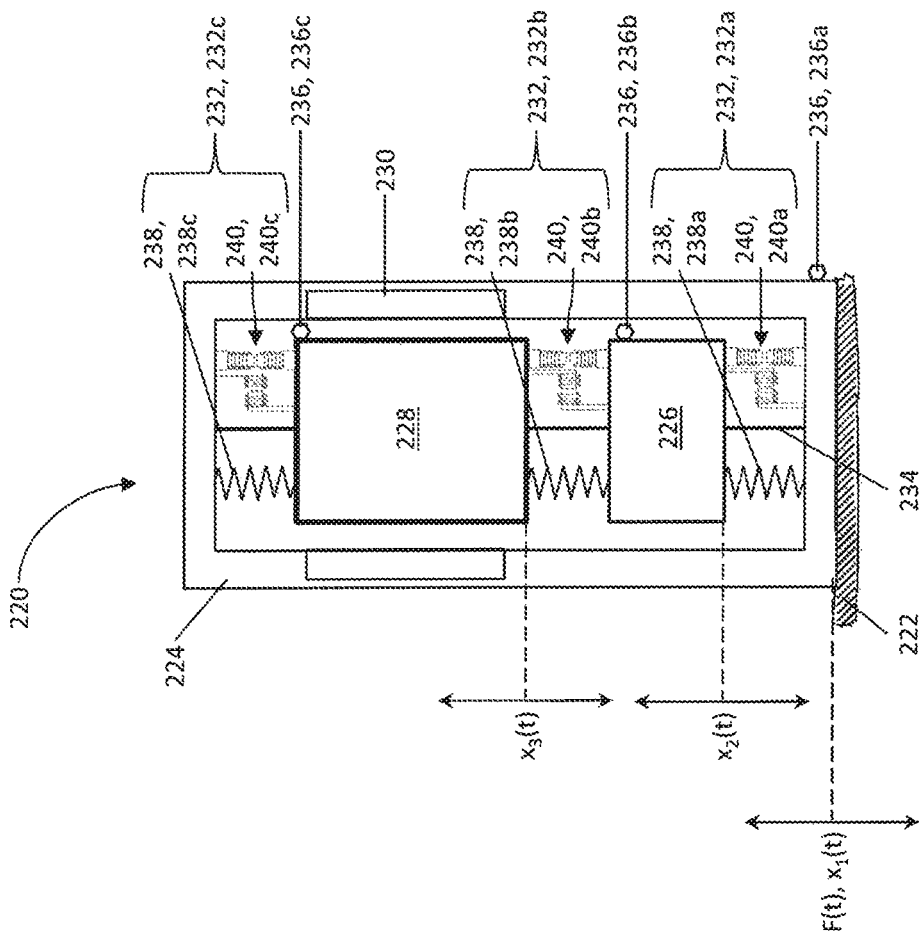

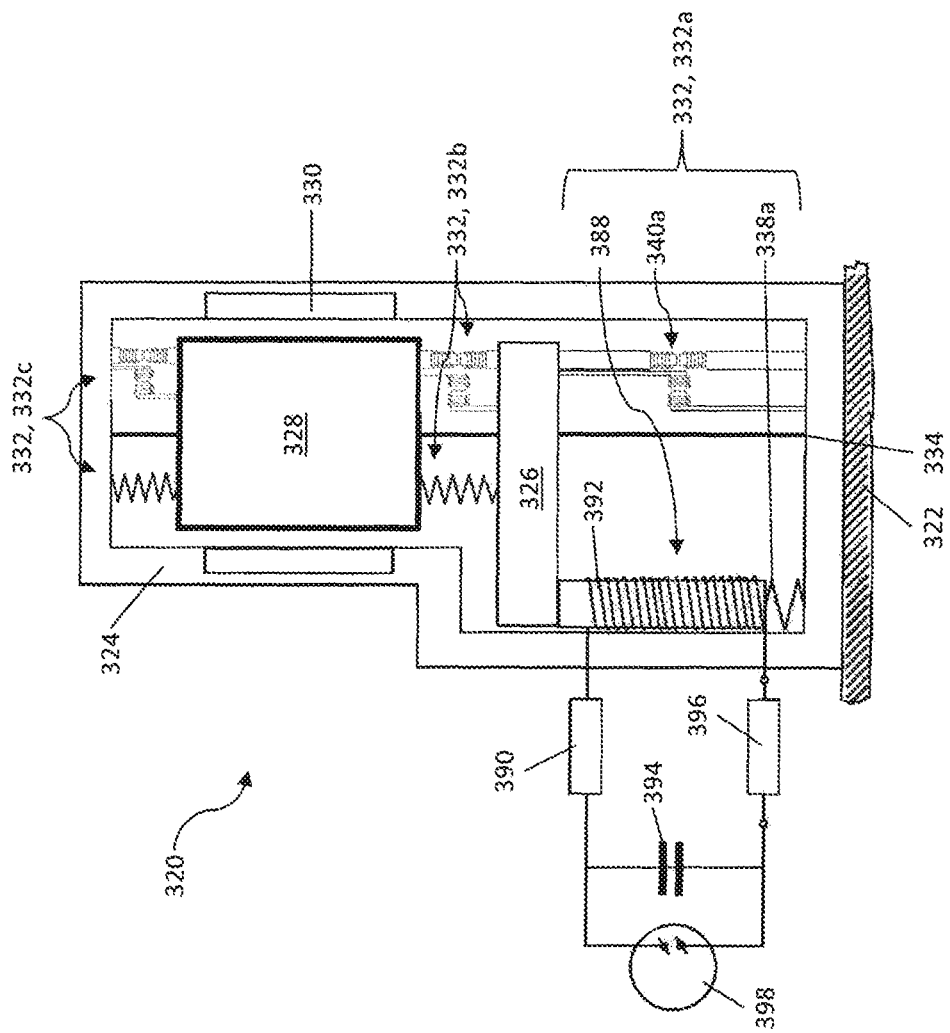
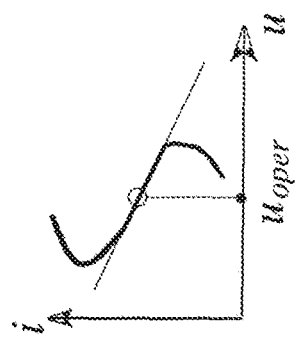

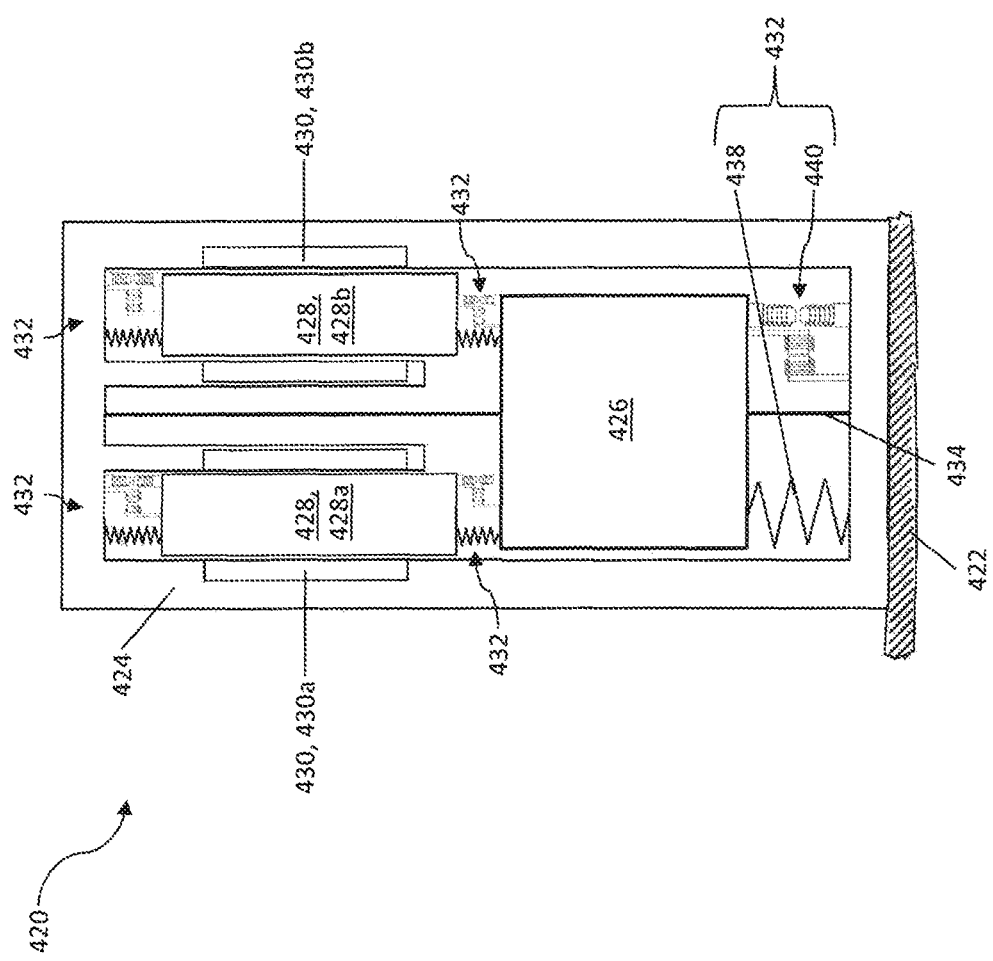

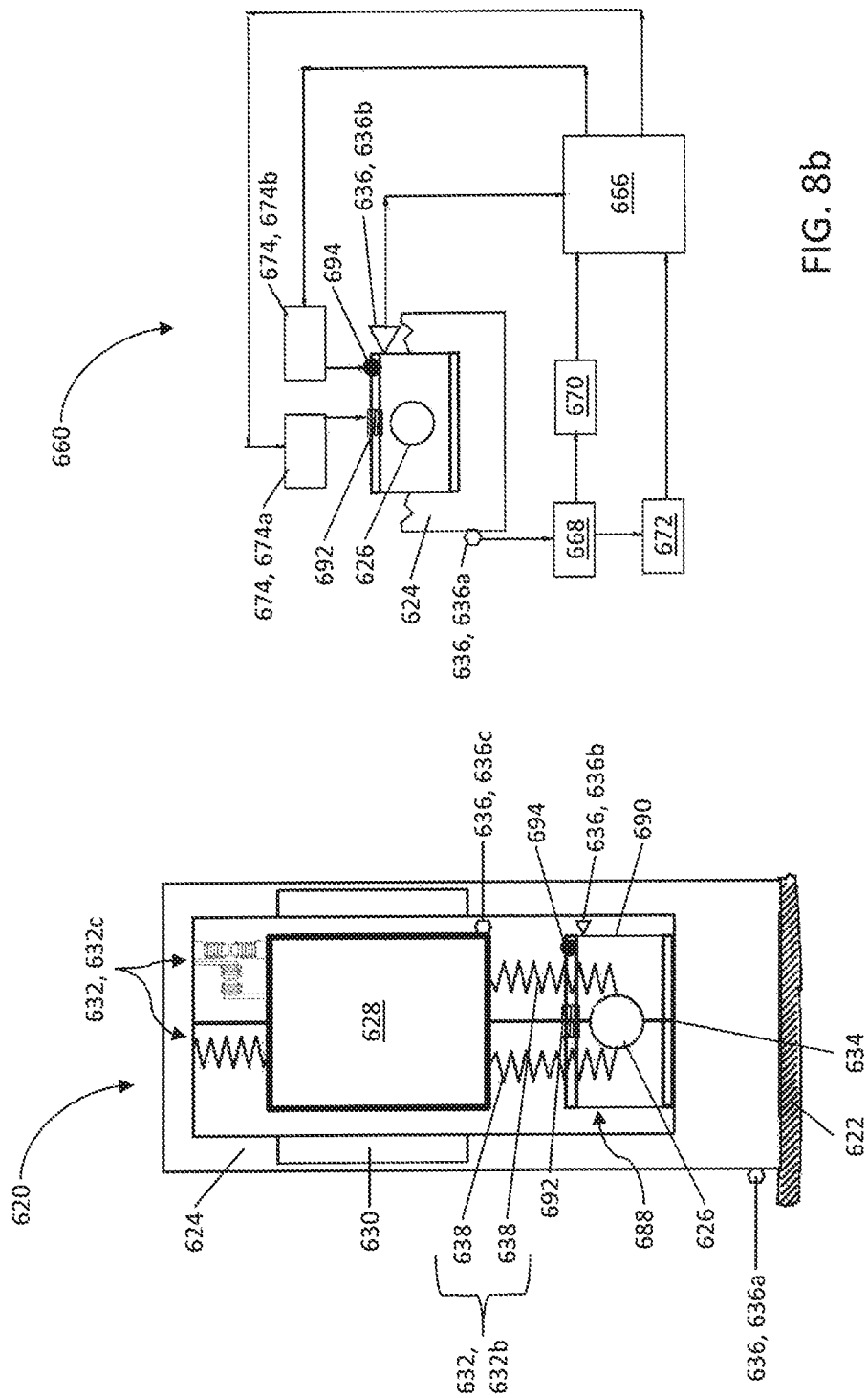

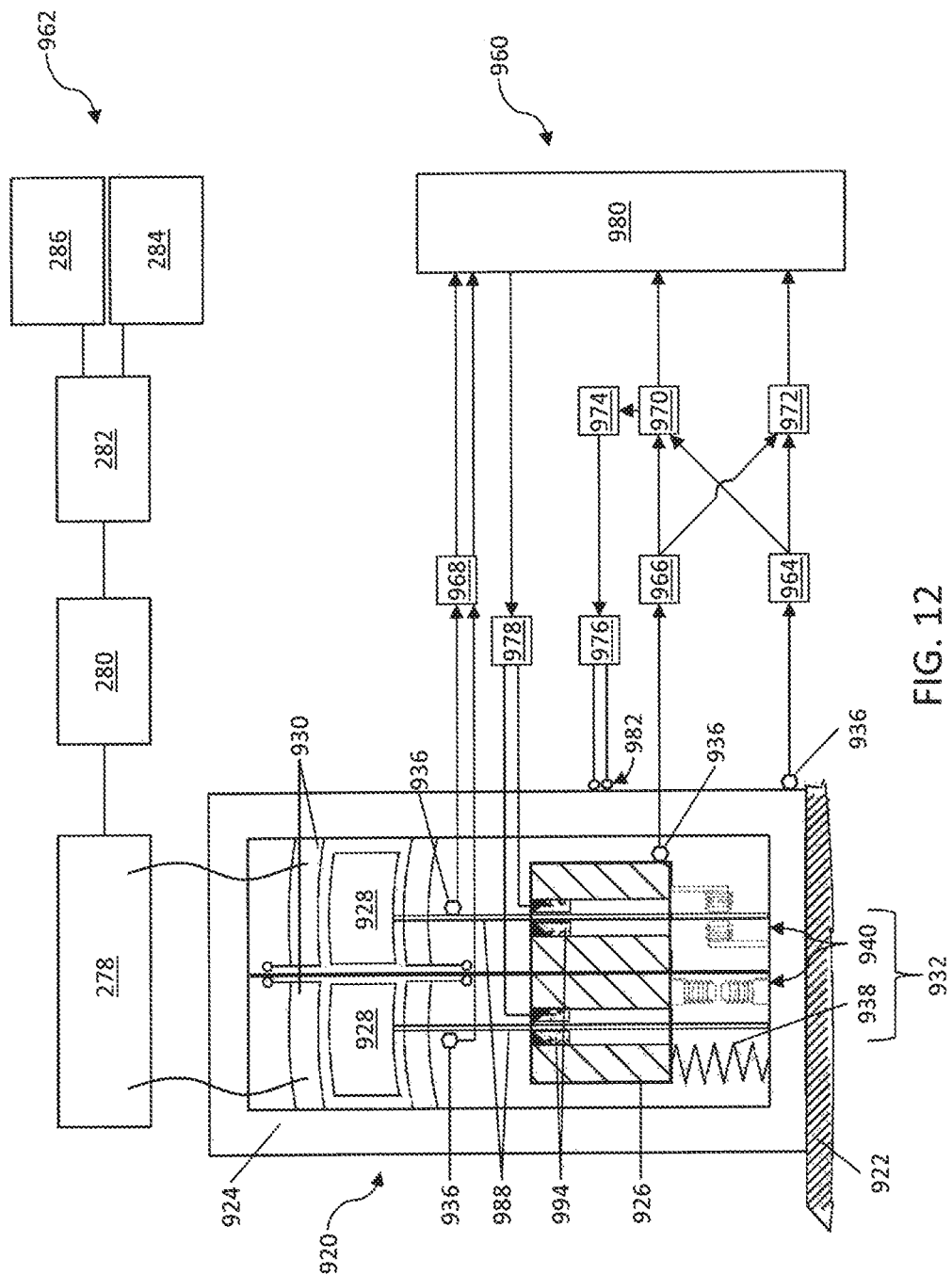

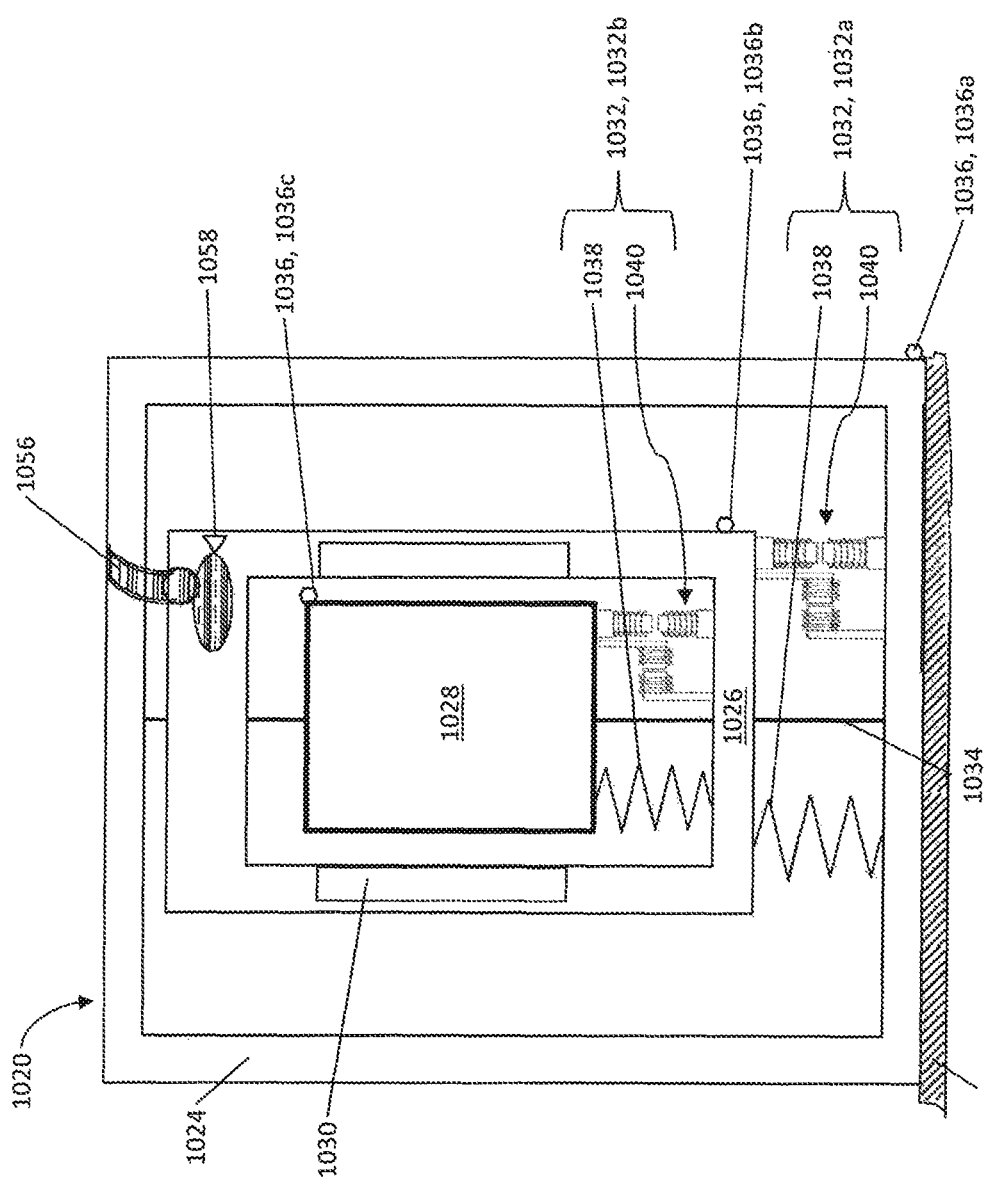

VIBRATION ENERGY HARVESTING DAMPER

FIELD

The subject disclosure generally relates to vibration dampers for ameliorating vibrations of an object and to energy harvesters for converting vibrations into electrical energy, and more particularly to a vibration energy harvesting damper for both vibration damping and energy harvesting.

BACKGROUND

Eliminating or reducing vibrations is an important consideration in the design and operation of various objects. Objects ranging from the very small, such as micro-electronics, to the very large, such as buildings, are susceptible to undesired vibrations. If not ameliorated, these vibrations can cause negative effects, such as damage to the object. Accordingly, many modern objects include vibration dampers to reduce undesired vibrations.

A tuned mass damper is a common form of vibration damper and includes a mass that is specifically designed, or tuned, to oscillate at a frequency that counteracts an undesired vibration in an object. When the tuned mass damper is attached to the vibrating object, kinetic energy is dynamically transferred from the vibrating object to the moving mass within the damper to reduce the amplitude of the undesired vibration of the object.

Devices that capture mechanical energy from the environment and convert it to a more useful form are known as energy harvesters. Some vibration dampers act as energy harvesters by converting vibrational energy into electricity that can be stored or used to power other devices. A device that combines the functions of a vibration damper and an energy harvester is commonly known as a vibration energy harvesting damper ("VEHD").

A known example of a VEHD is shown in FIG. 1 and generally identified by reference character 120. The VEHD 120 is attached to an object 122 that is subjected to an external periodic force F(t), which causes the object to vibrate along the vertical axis over time. The external force F(t) comprises one or more harmonic force components that can be presented mathematically by a Fourier series. The first mode of these harmonic force components are typically the only harmonics large enough to cause concern and are therefore of particular importance. The frequency of this first mode harmonic is denoted by $\omega$.

A casing 124 of the VEHD 120 is formed of non-magnetic material and is secured to the vibrating object 122. The casing 124 and the object have a combined mass denoted by $m_1$ and oscillate rectilinearly with displacement $x_1(t)$, as a result of the force F(t). Within the casing 124, the VEHD 120 includes a spring 126, a tuned mass 128, a magnet 130 and an electrically conductive coil 132. The spring 126 is connected between the casing 124 and the tuned mass 128 and has a stiffness coefficient denoted by $c_1$ and some dissipative (viscous) coefficient. The tuned mass 128 and the magnet 130 are connected together and retained within the casing 124. Together, the tuned mass 128 and the magnet 130 have a combined mass denoted by $m_2$ and oscillate rectilinearly with displacement $x_2(t)$. The coil 132 is secured within the casing 124 (such as by embedding the coil 132 in the casing 124) and is positioned so that it surrounds the magnet 130.

When properly designed, the spring 126, the tuned mass 128 and the magnet 130 oscillate to suppress the vibrations of the object 122 and act as the tuned mass damper in the VEHD 120. At the same time, the movement of the magnet 130 causes a changing magnetic flux through the coil 132, which induces a current in the coil 132 that can be used to power other devices. In this way, the coil 132 and the magnet 130 act as the energy harvester in the VEHD 120. The minimal amplitude of the movement of the vibrating object 122, and the maximal amplitude of the movement of the tuned mass 128 and magnet 130, may be achieved when $c_1/m_2=\omega^2$. However, the current induced in the coil 132 is correlated to the movement of the magnet 130 alone, and will generally be maximized when the movement of the magnet 130 has a phase shift of 90 degrees from the movement of the coil 132. Accordingly, it could be said that only a portion of the amplitude of the movement of the tuned mass 128 and the magnet 130 goes to electricity generation. Thus, it is necessary to balance efficiency between the vibration damping and the energy harvesting functions of the VEHD 120. Additionally, the efficiency of the VEHD 120 will be impacted by variations in the frequency $\omega$ of the external force F(t).

U.S. Pat. No. 7,345,372 entitled "Electromechanical Generator for, and Method of, Converting Mechanical Vibrational Energy into Electrical Energy," and U.S. Pat. No. 7,453,163 entitled "Electromechanical Generator for, and Method of, Converting Mechanical Vibrational Energy into Electrical Energy" disclose an electromechanical device using a resonant mass-spring arrangement mounted within an enclosure. The resonant mass-spring arrangement comprises an inertial mass mounted to an internal wall of the enclosure by a spring and a damper, the spring and damper being in a parallel configuration. These references show that including a damper causes additional resistance and leads to additional losses of effectiveness of the device.

U.S. Pat. No. 7,554,224 entitled "Electromechanical Generator for Converting Mechanical Vibrational Energy into Electrical Energy" discloses further improvements to the electromechanical devices disclosed in U.S. Pat. Nos. 7,345,372 and 7,453,163.

U.S. Pat. No. 7,586,220 entitled "Electromechanical Generator for Converting Mechanical Vibrational Energy into Electrical Energy" discloses further improvements to the electromechanical devices disclosed in U.S. Pat. No. 7,554,224, focusing in particular on the magnetic core assembly.

U.S. Pat. No. 7,999,402 entitled "Electromechanical Generator for Converting Mechanical Vibrational Energy into Electrical Energy" discloses further improvements to the electromechanical devices disclosed U.S. Pat. Nos. 7,345,372 and 7,453,163, including incorporating at least one spring and the vibratable mount being connected to the resonator support for mounting the resonator to a vibratable body from which electrical energy is to be harvested.

U.S. Pat. No. 9,595,893 entitled "Non-stationary Multi-frequency Vibration Energy Harvesting with Tunable Electrical Impedance" discloses a simple mass-spring-damper model packed by elaborated electronics.

U.S. Pat. No. 9,461,530 entitled "Electromechanical Generator for Converting Mechanical Vibrational Energy into Electrical Energy" discloses an electromechanical generator based on a simple mechanical model comprising a housing, an electrically conductive coil assembly fixedly mounted in the housing, a magnetic core assembly movably mounted in the housing for linear vibrational motion along an axis, a first biasing device, mounted between the housing and the magnetic core assembly, adapted to apply a centering force acting to oppose movement of the magnetic core assembly away from a central position on the linear axis and a second magnetic biasing device adapted to provide a compensating force to compensate for variations in the centering force of the first biasing device due to temperature.

U.S. Pat. No. 9,121,233 entitled "Mitigation of Downhole Component Vibration using Electromagnetic Vibration Reduction" discloses an apparatus for reducing vibration in a downhole component. The apparatus includes: an electrically conductive auxiliary mass attached to the component and configured to vibrate in a direction corresponding to a direction of downhole component vibration and reduce a portion of the downhole component vibration; and a magnetic component configured to generate a magnetic field through the auxiliary mass having a direction at least partially perpendicular to the direction of auxiliary mass vibration, the magnetic field configured to induce a current in the auxiliary mass in response to auxiliary mass vibration. The apparatus has an auxiliary mass vibration frequency tuned relative to a selected natural vibration frequency of the downhole component to reduce vibration of the downhole component, the auxiliary mass vibration frequency based on a magnetic stiffness of the auxiliary mass, the magnetic stiffness based on a strength of the magnetic field and/or a resistance of the auxiliary mass.

U.S. Pat. No. 8,866,316 entitled "Tunable Vibration Energy Harvester and Method" discloses an energy harvester that comprises an energy conversion device configured to convert vibrational energy to electrical energy, a mass coupled to the energy conversion device, and at least one biasing mechanism coupled to the mass. The biasing mechanism is selectively adjustable and selectively adjusting the biasing mechanism adjusts a resonance frequency of the energy conversion device and the mass.

U.S. Pat. No. 8,866,317 entitled "Broadband Vibrational Energy Harvesting" discloses a system that converts environmental vibrational energy into electrical energy consisting of a transducer that undergoes oscillating movement in response to the vibrational energy in order to produce an oscillating electrical signal. Power electronics process the oscillating electrical signal. A control system (including at least one control element of the power electronics, at least one sensor and control electronics) carries out a control scheme that dynamically varies the dampening of the oscillating movement of the transducer over time. The control scheme is based upon a predetermined parametric relation involving a plurality of variables derived from the properties measured by the at least one sensor. In several embodiments, the plurality of variables includes a first variable representing excitation frequency of the transducer.

U.S. Pat. No. 8,253,281 entitled "Energy Harvesting Apparatus Incorporated into Shock Absorber" discloses a simple model based on a vehicle shock absorber applicable for deployment on a vehicle.

U.S. Pat. No. 8,222,754 entitled "Vibration-Based Power Generator" discloses a vibration-based power generator with variable stiffness oscillator connected to a base. The oscillator comprises an inertial mass moving relative to the base in response to vibrations. The oscillator has a neutral position corresponding to a position of the oscillator when no vibrations are transmitted to the base. The oscillator has a first position where the mass is at a first distance and a second position where the inertial mass is at a second distance from a position of the mass when the oscillator is in neutral position. The second distance is greater than the first distance. A stiffness of the oscillator at the second position is greater than a stiffness of the oscillator at the first position. A transducer generating electric power in response to movement of the inertial mass is associated with the oscillator.

U.S. Pat. No. 8,063,498 entitled "Harvesting Energy from Vehicular Vibrations" discloses an energy harvesting apparatus deployed on a vehicle and that comprises a vehicular shock absorber capable of reciprocating translational movement in response to roadway perturbations. A coil is mounted within the shock absorber. An engine is also mounted within the shock absorber for converting the translational movement into rotational movement. A magnet is coupled to the engine and is configured to be rotated in the vicinity of the coil to produce electrical energy in the coil.

U.S. Pat. No. 9,484,795 entitled "Vibration Energy Harvesting Using Cycloidal Motion" discloses an energy conversion apparatus, comprising: a casing; an electromagnetic (EM) transducer disposed at one side of the casing; a round magnet disposed in the casing and free to move relative to the casing and the EM transducer in at least two degrees of freedom; and a ferromagnetic object fixed relative to the casing at an opposite side of the casing to the EM transducer and arranged to attract the magnet toward a neutral position within the casing. The EM transducer is positioned so that movement of the magnet relative to the EM transducer varies the magnetic field through the EM transducer, thereby generating electrical potential across at least a part of the EM transducer.

U.S. Pat. No. 7,569,952 entitled "High Efficiency, Inductive Vibration Energy Harvester" discloses an energy harvester focusing on magnetic properties. The apparatus comprises a permanent magnet magnetic field source (should have two dipole magnets) attached by a pair of compact spiral disk springs to an induction coil. The springs position the magnet so that the induction coil surrounds one end of the magnet where the flux density is greatest. In addition, the magnetic flux emerging from that end of the magnet is enhanced by a disk of magnetic material having high permeability and high flux density.

U.S. Pat. No. 9,887,610 entitled "Flexible Devices, Systems, and Methods for Harvesting Energy" discloses a microfluidic device comprising: a channel configured to be pressurized; a fluid contained within the channel; one or more chambers in fluid communication with the channel; a flexible membrane configured to deform in response to a force applied thereto, thereby pressurizing the fluid; a plurality of magnetic elements separated from one another by nonmagnetic spacers, wherein the pressurized fluid is capable of moving the plurality of magnetic elements and the nonmagnetic spacers along the channel; and a plurality of coils surrounding the channel, the coils comprising an electrically conductive material. Also disclosed is a microfluidic device comprising: a channel configured to be pressurized; a fluid contained within the channel; one or more chambers in fluid communication with the channel; a plurality of magnetic elements separated from one another by nonmagnetic spacers, wherein the fluid is capable of moving the plurality of magnetic elements and the nonmagnetic spacers along the channel; and a plurality of coils surrounding the channel, the coils comprising an electrically conductive material, wherein the one or more chambers comprise a first chamber and a second chamber, and the first chamber has a smaller cross-sectional area than the second chamber. Further disclosed is a system comprising: a plurality of chambers; a plurality of channels connected to the plurality of chambers and forming fluid interconnection therebetween; a fluid located in the plurality of chambers and in the plurality of channels; a plurality of pistons sized and configured to pressurize the fluid in the plurality of chambers; a plurality of coils surrounding the plurality of channels; a plurality of magnetic elements located in the plurality of channels, the magnetic elements being sized and configured to induce current in the plurality of coils; and a plurality of nonmagnetic spacers located in the plurality of channels and separating one magnetic element from another.

U.S. Pat. No. 9,835,218 entitled "Vehicle Active Damper" discloses a device which includes a damping actuator that is provided between a radiator and a vehicle body so as to be interposed in a substantially vertical direction, and a coupling member that elastically couples between the vehicle body and an engine. The damping actuator is formed from an elastic modulus-variable member having an elastic modulus that varies according to the strength of an applied magnetic field. The coupling member transmits vibrations of the engine to the vehicle body along a substantially vertical direction.

U.S. Pat. No. 9,726,254 entitled "Tuned Mass Damper" discloses a tuned mass vibration damper including at least one damper mass and at least one guide component part to movably guide the at least one damper mass.

U.S. Pat. No. 8,914,154 entitled "Active Tuned Vibration Absorber" discloses an actuator, several combinations of springs and a control system for a tuned mass damper.

U.S. Pat. No. 7,461,728 entitled "Active Vibration Damping System" discloses an actuator and control system for an active vibration damper.

U.S. Pat. No. 5,564,537 entitled "Adaptive-Passive Vibration Control System" discloses an apparatus containing a springing mass damper and an electronic controller designed to instruct the actuator to adapt the mass (for instance by fluid) to compensate for the sensed vibration. Also the stiffness of the spring, rather than the mass of the weight, may be adjusted on-line to "tune" the vibration absorber. Further, if more than one excitation frequency is present, a plurality of on-line adaptive and/or purely passive vibration absorbers may be cascaded so as to minimize vibrations due to a plurality of excitation frequencies.

U.S. Pat. No. 4,724,923 entitled "Vibration Absorber with Controllable Resonance Frequency" discloses an apparatus comprising an electromagnet rigidly connected to the first part of the structure and a body of magnetizable material connected via a resilient element to the first part of the structure, while an air gap is provided between the electromagnet and the body. The electromagnet is energized by a variable current through at least one coil and it exerts an attractive force on the body which is oscillating due to the vibrations occurring in the first part of the structure. The restoring force exerted by the resilient element on the secondary body has the effect of lowering the resonant frequency of the second body on the resilient element as compared to the resonant frequency of the apparatus when no current passes through the coil. The amount of this lowering can be controlled depending upon the frequency of the exciting vibration by varying the electric current through the coil.

U.S. Pat. No. 9,871,472 entitled "Energy-Harvesting Apparatus with Plural Mechanical Amplifiers" discloses an energy-harvesting device containing a first mechanical amplifier responsive to the input vibration and a second mechanical amplifier coupled to the first mechanical amplifier. At least one of the first and second mechanical amplifiers comprises a parametric resonator, and a power output of the energy harvester is generated by damping the second mechanical amplifier.

U.S. Pat. No. 9,787,220 entitled "Energy Harvester" discloses a very simple apparatus with a mass and first and second elastic beams connecting the mass to the frame, wherein the first and second elastic beams are provided with opposite stiffnesses so that the mass experiences a preselected stiffness in a predefined range of conditions.

U.S. Pat. No. 9,748,872 entitled "Vibrational Energy Harvesting System" discloses a very simple vibrating system furnished by elaborate control and energy generating schemes.

U.S. Pat. No. 9,653,980 entitled "Energy Harvesting System Using Several Energy Sources" discloses using several energy sources and paying attention to electromagnetic issues.

U.S. Pat. No. 9,644,601 entitled "Linear Faraday induction Generator for the Generation of Electrical Power from Ocean Wave Kinetic Energy and Arrangements Thereof" discloses a linear faraday induction generator for the generation of electrical power from ocean wave kinetic energy, and arrangements thereof focusing on large-scale solutions.

U.S. Pat. No. 9,627,925 entitled "Methods and. Apparatus for Managing and Utilizing Harvested Energy" discloses process or flow diagrams for a specific energy harvester.

U.S. Pat. No. 9,121,394 entitled "Energy Harvester for Converting Vibrational Motion of a Vibrating Equipment into Electrical Energy, and a Device for Monitoring the Operation of a Vibrating Equipment" discloses a device having a mechanical scheme based on a pendulum arranged to be pivotably attached to vibrating equipment.

U.S. Pat. No. 9,118,187 entitled "Vibrational Energy Harvester" discloses a mass-cantilever energy harvester.

U.S. Pat. No. 9,059,628 entitled "Energy Harvesting" discloses devices applicable in vehicles vibrating with low frequencies.

U.S. Pat. No. 8,987,924 entitled "Self-tuning Energy Harvester" discloses an apparatus for generating electricity containing a flexural member configured to flex upon being subject to a vibration. A plurality of weight displacement systems is disposed at the flexural member, each weight displacement system in the plurality being configured to displace a moveable weight upon receipt of a signal. A processor is configured to provide a signal to each weight displacement system in order to achieve a desired resonant frequency of the flexural member. An electricity generating device is coupled to the flexural member and configured to generate electricity upon flexing of the flexural member. This apparatus is applicable for logging tools conveyed through boreholes penetrating geologic formations.

U.S. Pat. No. 8,350,394 entitled "Energy Harvester Apparatus Having improved Efficiency" discloses a system consisting of more springs and masses, representing 2 and 3 degrees-of-freedom (DOF) energy harvesters, in which some collidable mass elements move ballistically along a linear path defined by a guiding rod, and at the same time produce electricity in the electromagnetic module.

U.S. Pat. No. 9,871,472 entitled "Energy-Harvesting Apparatus with Plural Mechanical Amplifiers" discloses a device using the effect of parametric resonance. The energy harvester comprises a first mechanical amplifier responsive to the input vibration and a second mechanical amplifier connected to the first mechanical amplifier. At least one of the amplifiers comprises a parametric resonator, and a power output of the energy harvester is generated by damping the second mechanical amplifier.

U.S. Pat. No. 7,464,800 entitled "Torsional Vibration Damper of a Rotating Shaft" discloses a vibration energy harvesting tuned damper applied for rotational systems.

Although the contributions of the above references are laudable, these known devices may not provide both efficient energy harvesting and efficient vibration damping, particularly when the frequency of an object's vibrations are changing over a broad range. Accordingly, improvements and alternatives for vibration energy harvesting dampers are generally desired.

SUMMARY

It should be appreciated that this Summary is provided to introduce a selection of concepts in a simplified form that are further described below in the Detailed Description. This Summary is not intended to be used to limit the scope of the claimed subject matter.

Accordingly, in one aspect, there is provided a vibration energy harvesting damper (VEHD) comprising: a support structure that is securable to a vibrating object; a tuned mass retained by the support structure and movable in a rectilinear direction; a magnet vibrationally coupled to and spaced apart from the tuned mass; a coil surrounding the magnet; and at least one biasing assembly connecting two or more of the support structure, the tuned mass and the magnet, the at least one biasing assembly comprising a fixed biasing member and an adjustable biasing member arranged in parallel, wherein the adjustable biasing member is configured to adjust a combined stiffness coefficient of the biasing assembly.

In one or more embodiments, the adjustable biasing member is operable in a first mode to increase the combined stiffness coefficient of the biasing assembly and is operable in a second mode to decrease the combined stiffness coefficient of the biasing assembly.

In one or more embodiments, the adjustable biasing member comprises a first electromagnetic arrangement configured to increase the combined stiffness coefficient of the biasing assembly and a second electromagnetic arrangement configured to decrease the combined stiffness coefficient of the biasing assembly. The first electromagnetic arrangement may comprise: a first pair of permanent magnets aligned with opposite poles facing each other and oriented generally perpendicular to the rectilinear direction; and a first pair of coils surrounding the first pair of permanent magnets, wherein the first pair of coils are configured to be selectively energized to adjust a gap between the first pair of permanent magnets to increase the combined stiffness coefficient of the biasing assembly. The second electromagnetic arrangement may comprise: a second pair of permanent magnets aligned with the same poles facing each other and oriented generally in the rectilinear direction; and a second pair of coils surrounding the second pair of permanent magnets, wherein the second pair of coils are configured to be selectively energized to adjust a gap between the second pair of permanent magnets to decrease the combined stiffness coefficient of the biasing assembly.

In one or more embodiments, the adjustable biasing members comprises a single electromagnetic arrangement having a pair of permanent magnets and a pair of coils that surround the pair of permanent magnets and are configured to be selectively energized to adjust a gap between the pair of permanent magnets, wherein the pair of permanent magnets and the pair of coils are rotatable between a first configuration, where the pair of permanent magnets are aligned with opposite poles facing each other and are oriented generally perpendicular to the rectilinear direction, and a second configuration, where the pair of permanent magnets are aligned with the same poles facing each other and are oriented generally in the rectilinear direction, wherein the single electromagnetic arrangement is configured to increase the combined stiffness coefficient of the biasing assembly when in the first configuration, and wherein the single electromagnetic arrangement is configured to decrease the combined stiffness coefficient of the biasing assembly when in the second configuration.

In one or more embodiments, the at least one biasing assembly comprises a first biasing assembly connected between the support structure and the tuned mass, a second biasing assembly connected between the tuned mass and the magnet, and a third biasing assembly connected between the magnet and the support structure.

In one or more embodiments, the at least one biasing assembly further comprises a friction reduction unit arranged in series with the fixed biasing member, the friction reduction unit comprising a resistor-inductor-capacitor circuit in series with a device having a falling volt-amp characteristic.

In one or more embodiments, the magnet and the coil are a first magnet and a first coil, and the VEHD further comprises a second magnet and a second coil that are arranged in parallel with the first magnet and the first coil, wherein the second magnet is vibrationally coupled to and spaced apart from the tuned mass, and wherein the second coil surrounds the second magnet. The at least one biasing assembly may comprise a first biasing assembly connected between the support structure and the tuned mass, a second biasing assembly connected between the tuned mass and the first magnet, a third biasing assembly connected between the first magnet and the support structure, a fourth biasing assembly connected between the tuned mass and the second magnet, and a fifth biasing assembly connected between the second magnet and the support structure.

In one or more embodiments, the magnet comprises an array of magnets and the coil comprises an array of coils, wherein each of the magnets in the array of magnets is surrounded by at least one of the coils in the array of coils. The VEHD may further comprise at least one inter-magnet cushion positioned between adjacent magnets in the array of magnets.

In some embodiments, the at least one biasing assembly is connected between the support structure and the magnet, the VEHD further comprises at least one fixed biasing member connected between the magnet and the tuned mass, and the VEHD further comprises a vibro-impact assembly that includes the tuned mass and a container, with the container secured to the support structure and the tuned mass positioned within the container. The vibro-impact assembly may further include an amplitude tuner and a density regulator, wherein the amplitude tuner is positioned at least partially within the container and is configured to adjust the maximum amplitude with which the tuned mass can vibrate within the container, and wherein the density regulator is configured to adjust the density of fluid in the container.

In one or more embodiments, the tuned mass comprises a pair of tuned masses, the magnet comprises a pair of magnets, the VEHD further comprises a pair of vibro-impact assemblies, and each of the vibro-impact assemblies includes one of the tuned masses and a container, with the container secured to the support structure and the one of the tuned masses positioned within the container. The at least one biasing assembly may comprise a pair of the biasing assemblies, wherein each of the biasing assemblies is connected between a corresponding one of the magnets and one of the vibro-impact assemblies, with the fixed biasing member connected between the corresponding magnet and the tuned mass of the corresponding vibro-impact assembly, and with the adjustable biasing member connected between the corresponding magnet and the container of the corresponding vibro-impact assembly.

In one or more embodiments, the at least one biasing assembly is connected between the support structure and the tuned mass, the magnet comprises a pair of magnets that are aligned with the same poles facing each other and are configured to move oppositely in a generally transverse direction to the rectilinear direction, the coil comprises a pair of coils and each of the coils surrounds one of the magnets, the tuned mass includes a pair of slots, the VEHD further comprises a pair of cantilever beams with each of the cantilever beams extending through one of the slots and being connected between the support structure and one of the magnets, and the tuned mass is configured to slidingly engage the cantilever beams to increase the vibration of the magnets via parametric resonance. The tuned mass may include at least one clamp within each of the slots that slidingly engages the cantilever beam and is movable within the slot to adjust a free length of the cantilever beam.

In one or more embodiments, the at least one biasing assembly comprises a first biasing assembly connected between the support structure and the tuned mass and a second biasing assembly connected between the tuned mass and the magnet, the magnet is retained within the tuned mass and the coil is secured to the tuned mass in a position surrounding the magnet, the tuned mass is at least partially hollow, and the VEHD further comprises a fluid filler that is configured to adjust the mass of the tuned mass by adding or removing fluid from the hollow of the tuned mass.

In one or more embodiments, the VEHD further comprises a plurality of sensors and a control system, the plurality of sensors being configured to measure the vibration of the support structure, the tuned mass and the magnet, and the control system being configured to receive the measured vibrations and adjust the combined stiffness coefficient of the at least one biasing assembly.

Accordingly, in another aspect, there is provided a method for adjusting a VEHD having a support structure, a tuned mass, a magnet and at least one biasing assembly that includes a fixed biasing member and an adjustable biasing member arranged in parallel, the method comprising: measuring the vibration of at least one of the support structure, the tuned mass and the magnet; comparing at least one of a frequency, an amplitude and a phase of the measured vibration to at least one of a previously measured frequency, a previously measured amplitude and a previously measured phase to determine a change in at least one of the frequency, the amplitude and the phase of the vibration; analyzing the change in the at least one of the frequency, the amplitude and the phase of the vibration to generate a tuning signal for adjusting an electromagnetic stiffness coefficient of the adjustable biasing member; and actuating the adjustable biasing member based on the tuning signal to adjust the electromagnetic stiffness coefficient of the adjustable biasing member and thereby adjust a combined stiffness coefficient of the biasing assembly.

Accordingly, in another aspect, there is provided an array of the vibration energy harvesting dampers (VEHDs) in accordance with the above Summary and connected to an object, each of the VEHDs being configured to reduce an amplitude of vibration of the object in a different respective direction.

BRIEF DESCRIPTION OF THE DRAWINGS

Embodiments will now be described more fully with reference to the accompanying drawings, in which:

FIG. 2a is a schematic view of a VEHD in accordance with the subject disclosure;
FIG. 2b is an enlarged fragmentary view of an adjustable biasing assembly of the VEHD of FIG. 2a;
FIG. 3 is a schematic view of a control system and a power system for the VEHD of FIG. 2a;
FIG. 5a is a schematic view of a VEHD having a friction reduction unit;
FIG. 5b is a graph showing a falling volt-amp characteristic from the friction reduction unit of the VEHD of FIG. 5a;
FIG. 6 is a schematic view of a VEHD having a plurality of magnets arranged in parallel;
FIG. 8a is a schematic view of a VEHD having a vibro-impact assembly;
FIG. 8b is a schematic view of a control system for the VEHD of FIG. 8a;
FIG. 11b is an enlarged fragmentary view of a portion of a tuned mass and a cantilever beam passing therethrough, from the VEHD of FIG. 11a;
FIG. 11c is a schematic view of the motion of a point of contact on the tuned mass from the VEHD of FIG. 11a;
FIG. 12 is a schematic view of a control system and a power system for the VEHD of FIG. 11a;
and
FIG. 13 is a schematic view of a VEHD having an adjustable tuned mass and a fluid filler.

DETAILED DESCRIPTION OF EMBODIMENTS

Figure 1:
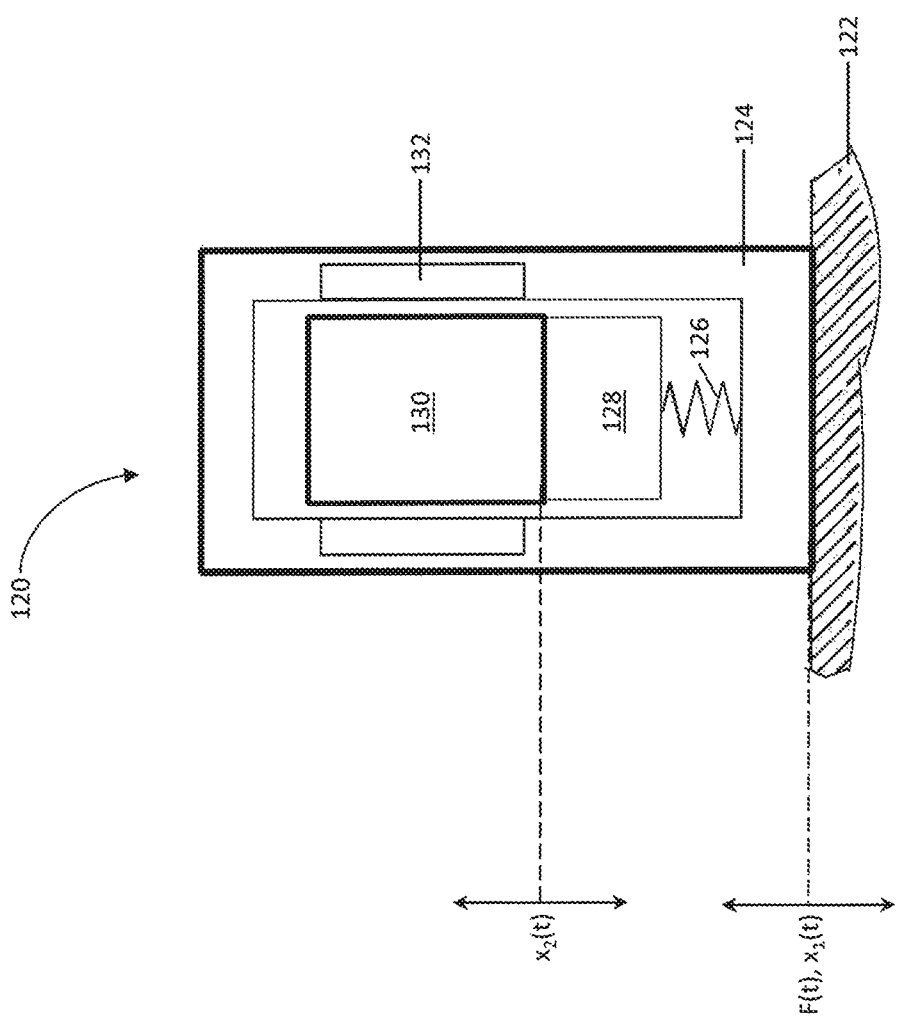
FIG. 1 is a schematic view of a known VEHD.

The foregoing summary, as well as the following detailed description of certain embodiments will be better understood when read in conjunction with the accompanying drawings. As will be appreciated, like reference characters are used to refer to like elements throughout the description and drawings. As used herein, an element or feature recited in the singular and preceded by the word "a" or "an" should be understood as not necessarily excluding the plural of the elements or features. Further, references to "one example" or "one embodiment" are not intended to be interpreted as excluding the existence of additional examples or embodiments that also incorporate the recited elements or features of that one example or one embodiment. Moreover, unless explicitly stated to the contrary, examples or embodiments "comprising", "having" or "including" an element or feature or a plurality of elements or features having a particular property may further include additional elements or features not having that particular property. Also, it will be appreciated that the terms "comprises", "has" and "includes" mean "including but not limited to" and the terms "comprising", "having" and "including" have equivalent meanings.

As used herein, the term "and/or" can include any and all combinations of one or more of the associated listed elements or features.

It will be understood that when an element or feature is referred to as being "on", "attached" to, "connected" to, "coupled" with, "contacting", etc. another element or feature, that element or feature can be directly on, attached to, connected to, coupled with or contacting the other element or feature or intervening elements may also be present. In contrast, when an element or feature is referred to as being, for example, "directly on", "directly attached" to, "directly connected" to, "directly coupled" with or "directly contacting" another element of feature, there are no intervening elements or features present.

It will be understood that spatially relative terms, such as "under", "below", "lower", "over", "above", "upper", "front", "back" and the like, may be used herein for ease of description to describe the relationship of an element or feature to another element or feature as illustrated in the figures. The spatially relative terms can however, encompass different orientations in use or operation in addition to the orientation depicted in the figures.

Reference herein to "example" means that one or more feature, structure, element, component, characteristic and/or operational step described in connection with the example is included in at least one embodiment and or implementation of the subject matter according to the present disclosure. Thus, the phrases "an example," "another example," and similar language throughout the present disclosure may, but do not necessarily, refer to the same example. Further, the subject matter characterizing any one example may, but does not necessarily, include the subject matter characterizing any other example.

Reference herein to "configured" denotes an actual state of configuration that fundamentally ties the element or feature to the physical characteristics of the element or feature preceding the phrase "configured to".

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the terms "approximately" and "about" represent an amount close to the stated amount that still performs the desired function or achieves the desired result. For example, the terms "approximately" and "about" may refer to an amount that is within less than 10% of, within less than 5% of, within less than 1% of, within less than 0.1% of, and within less than 0.01% of the stated amount.

As used herein, the term "substantially" may include exactly and similar, which is to an extent that it may be perceived as being exact. For illustration purposes only and not as a limiting example, the term "substantially" may be quantified as a variance of +/−5% from the exact or actual. For example, the phrase "A is substantially the same as B" may encompass embodiments where A is exactly the same as B, or where A may be within a variance of +/−5%, for example of a value, of B, or vice versa.

As disclosed above, a VEHD, such as the one shown in FIG. 1, can be used to reduce undesired vibrations in an object(i.e. vibration damping) and to convert vibrational energy into electrical energy, or other useful forms of energy (i.e. energy harvesting). The efficiency of the VEHD in these dual purposes of vibration damping and energy harvesting will depend on the proper design of the VEHD for a given frequency of vibration. Thus, as the frequency of a vibrating object changes, the efficiency of the VEHD may decrease. The potential power available for harvesting from vibrating objects can be substantial. For example, a general evaluation of maximum power $P_0$ lost by certain oscillating objects such as motors, which could be harvested, can be approximated by the equation:

$$P_0 = 0.5\beta A_m^2 \omega^2$$

where $A_m$ is a resonance amplitude of the object, $\omega$ is a resonance frequency, and $\beta$ is a viscous damping coefficient. For a motor with an amplitude of 0.1 mm, a resonance frequency of 60 Hz and a viscous damping coefficient of 14600 kg/s, the maximum power for harvesting would be 10.4 Watts. Accordingly, a VEHD that is adaptable to a broad range of frequencies and that has a simple mechanical and electrical construction is desired.

The subject disclosure describes vibration energy harvesting dampers, as well as methods for adjusting the same and arrays of the same. Broadly stated, the subject vibration energy harvesting dampers described herein each comprise: a support structure that is securable to a vibration object; a tuned mass retained by the support structure and movable in a rectilinear direction; a magnet vibrationally coupled to and spaced apart from the tuned mass; a coil surrounding the magnet; and at least one biasing assembly connecting two or more of the support structure, the tuned mass and the magnet, the at least one biasing assembly comprising a fixed biasing member and an adjustable biasing member arranged in parallel, wherein the adjustable biasing member is configured to adjust a combined stiffness coefficient of the biasing assembly.

FIG. 2a shows a VEHD in accordance with the subject disclosure and generally identified by reference character 220. The VEHD 220 is configured to provide both vibration damping and energy harvesting, over a broad range of frequencies. The VEHD 220 is attached to a vibrating object 222 and comprises a casing 224, a tuned mass 226, a magnet 228, a coil 230, a plurality of biasing assemblies 232 and a guide 234. The tuned mass 226 and the magnet 228 are retained by the casing 224 and are movable in a rectilinear direction, along the guide 234. The plurality of biasing assemblies 232 are connected between the casing 224, the tuned mass 226 and the magnet 228 and vibrationally couple the connected elements, such that the vibration of each one of the coupled elements influences the vibration of the other coupled elements. The coil 230 surrounds the magnet 228 and is secured to the casing 224, for example by being embedded in the casing 224. As will be appreciated, the tuned mass 226, the magnet 228 and the plurality of biasing assemblies 232 generally form a vibration damper, while the magnet 228 and the coil 230 generally form an energy harvester. The VEHD 220 may further comprise a plurality of sensors 236, such as accelerometers, for controlling the VEHD 220, as described below.

The casing 224 is configured to retain the various components of the VEHD 220 and is configured to securely attach to the vibrating object 222. The casing 224 is formed of a non-magnetic material, such as non-magnetic metal, plastic or other suitable material. The casing 224 may be cylindrically shaped or may be another suitable shape, as will be appreciated. Although a casing 224 is shown and described herein, it will be appreciated by those skilled in the art that other suitable support structures may be used, such as a frame.

The tuned mass 226 is configured to provide vibration damping to the object 222 and to amplify the vibrations of the magnet 228 within the coil 230. The tuned mass 226 is constrained to move in the rectilinear direction (i.e. in a single direction, such as the vertical direction in FIG. 2a) by the guide 234. The tuned mass 226 has a mass that is sufficient to reduce undesired vibrations in the object 222, as described below. The tuned mass 226 is formed of a non-magnetic material, such as a non-magnetic metal, and may be cylindrically shaped or another suitable shape, as will be appreciated.

The magnet 228 is configured to provide vibration damping to the object 222 and is configured to generate a changing magnetic flux when vibrating within the casing 224. The magnet 228 is constrained to move in the rectilinear direction (e.g. the vertical direction in FIG. 2a) by the guide 234. The magnet 228 is formed of a permanent magnetic material, such as an alloy of neodymium, and has sufficient magnetic field strength to induce a useful electrical current in the coil 230, as described below. The magnet 228 may be a single unitary magnet or may be an array of individual magnets.

The coil 230 is configured to produce a useful electrical current when exposed to the changing magnetic flux generated by the magnet 228. The coil 230 is embedded or otherwise secured within the casing 224 in a position surrounding the magnet 228 and terminates in a pair of electrical contacts (not shown in FIG. 2a), which may be connected to a power system or other electrical load. The coil 230 comprises a number of turns for generating the useful electrical current when exposed to the changing magnetic flux. The coil 230 is formed of an electrically conductive material, such as copper wire, which may be coated to prevent short circuiting of the coil 230.

The plurality of biasing assemblies 232 is configured to bias the tuned mass 226 and the magnet 228 towards respective neutral positions (i.e. their positions before vibrating) within the casing 224. The plurality of biasing assemblies 232 comprises a first biasing assembly 232a, a second biasing assembly 232b and a third biasing assembly 232c. The first biasing assembly 232a is connected between the casing 224 and the tuned mass 226. The second biasing assembly 232b is connected between the tuned mass 226 and the magnet 228. The third biasing assembly 232c is connected between the magnet 228 and the casing 224, opposite the first biasing assembly 232a.

Each of the biasing assemblies 232 is configured to provide a combined stiffness coefficient, as described below, and comprises a fixed biasing member 238 and an adjustable biasing member 240, which are arranged in parallel. The first biasing assembly 232a comprises a first fixed biasing member 238a and a first adjustable biasing member 240a. The second biasing assembly 232b comprises a second fixed biasing member 238b and a second adjustable biasing member 240. The third biasing assembly 232c comprises a third fixed biasing member 238c and a third adjustable biasing member 240c.

The fixed biasing members 238 are configured to provide generally fixed stiffness coefficients. Each of the fixed biasing members 238 comprises a mechanical spring (such as a coil spring, a clamped flat bar, a cantilever beam, etc.) and/or a hydraulic or pneumatic spring, and each of the fixed biasing members 238 has a fixed stiffness coefficient denoted generally by c. That is, the first fixed biasing member 238a has a stiffness coefficient denoted by $c_1$, the second fixed biasing member 238b has a stiffness coefficient denoted by $c_2$ and the third fixed biasing member 238c has a stiffness coefficient denoted by $c_3$. As shown in FIG. 2a, all of the fixed biasing members 238 can be identical. Alternatively, the fixed biasing members 238 may have different configurations to each other.

The adjustable biasing members 240 are configured to provide adjustable stiffness coefficients. Each of the adjustable biasing members 240 comprises a first electromagnetic arrangement 242 and a second electromagnetic arrangement 244 (as shown in FIG. 2b), which are arranged in parallel and act as an electromagnetic spring to collectively provide an adjustable electromagnetic stiffness coefficient generally denoted by e. That is, the first adjustable biasing member 240a has an electromagnetic stiffness coefficient denoted by $e_1$, the second adjustable biasing member 240b has an electromagnetic stiffness coefficient denoted by $e_2$ and the third adjustable biasing member 240c has an electromagnetic stiffness coefficient denoted by $e_3$, which are all adjustable.

The first electromagnetic arrangement 242 is configured to increase the electromagnetic stiffness coefficient of the respective adjustable biasing member 240. The first electromagnetic arrangement 242 comprises a pair of permanent magnets 246 located within a pair of corresponding coils 248. The permanent magnets 246 are horizontally aligned with opposite poles facing each other (i.e. the north pole of one magnet faces the south pole of the other magnet). Accordingly, an attractive force is generated between the permanent magnets 246, which acts to increase the electromagnetic stiffness coefficient of the adjustable biasing member 240. As will be appreciated, the magnitude of the attractive force will depend on the gap between the magnets 246, at least. Therefore, the electromagnetic stiffness coefficient of the adjustable biasing member 240 can be adjusted between a neutral value and a maximum value by adjusting the gap between the permanent magnets 246 between a maximum distance and a minimum distance, respectively. To adjust the gap, the permanent magnets 246 are horizontally movable within the coils 248, by energizing at least a portion of the coils 248. The coils 248 themselves are secured by support structure (not shown) to adjoining components of the VEHD 220, such as the casing 224, the tuned mass 226 or the magnet 228. As will be appreciated, the adjoining component to which each coil 248 is attached will depend on the adjustable biasing member 240 being considered. In the embodiment shown in FIG. 2a, the adjoining components for the adjustable biasing member 240a are the casing 224 and the tuned mass 226, the adjoining components for the adjustable biasing member 240b are the tuned mass 226 and the magnet 228 and the adjoining components for the adjustable biasing member 240c are the magnet 228 and the casing 224. In other embodiments, the coils 248 may be secured to other adjoining components of the VEHD 220.

The second electromagnetic arrangement 244 is configured to decrease the electromagnetic stiffness coefficient of the adjustable biasing member 240. As show in FIG. 2b, the second electromagnetic arrangement 244 comprises a pair of permanent magnets 250 located within a pair of corresponding coils 252. The permanent magnets 250 are vertically aligned with the same poles facing each other (i.e. the north pole of one magnet faces the north pole of the other magnet as shown in FIG. 2b or, alternatively, the south poles of each magnet could face each other). Accordingly, a repulsive force is generated between the permanent magnets 250, which acts to decrease the electromagnetic stiffness coefficient of the adjustable biasing member 240. As will be appreciated, the magnitude of this repulsive force will depend on the gap between the magnets 250, at least. Therefore, the electromagnetic stiffness coefficient of the adjustable biasing member 240 can be adjusted between a neutral value and a minimum value by adjusting the gap between the permanent magnets 250 between a maximum distance and a minimum distance, respectively. To adjust the gap, the permanent magnets 250 are vertically movable within the coils 252, by energizing at least a portion of the coils 252. The coils 250 themselves are secured by support structure (not shown) to adjoining components of the VEHD 220, such as the casing 224, the tuned mass 226 or the magnet 228. As will be appreciated, the adjoining component to which each coil 252 is attached will depend on the adjustable biasing member 240 being considered. In the embodiment shown in FIG. 2a, the adjoining components for the adjustable biasing member 240a are the casing 224 and the tuned mass 226, the adjoining components for the adjustable biasing member 240b are the tuned mass 226 and the magnet 228 and the adjoining components for the adjustable biasing member 240c are the magnet 228 and the casing 224. In other embodiments, the coils 252 may be secured to other adjoining components of the VEHD 220.

The guide 234 is configured to constrain the movement of the tuned mass 226 and the magnet 228 to a rectilinear direction (e.g. the vertical direction in FIG. 2a). The guide 234 is secured within the casing 224 and extends between a first side of the casing 224 proximal to the object 222 and a second side of the casing 224, opposite the first side and distal from the object 222. The guide 234 comprises an elongate rod, which passes through corresponding voids (not shown) in the tuned mass 226 and the magnet 228. Other suitable constructions for the guide 234 will of course be apparent to those skilled in the art.

The plurality of sensors 236 is configured to detect the position, velocity and/or acceleration of the various elements of the VEHD 220, which can be used to help control the VEHD 220 as described below. The plurality of sensors 236 comprises a first sensor 236a secured to the casing 224 and/or the object 222, a second sensor 236b secured to the tuned mass 226 and a third sensor 236c secured to the magnet 228. Each of the sensors 236 is configured to output a motion signal that is representative of the vibrational motion of the element to which the sensor 236 is secured. In the embodiment of FIG. 2a, the sensors 236 are accelerometers. Alternatively, the sensors 236 may be position sensors, velocity sensors, or other motion sensors. Each of the sensors 236 is communicatively coupled to the control system for the VEHD 220, as will be described with reference to FIG. 3.

When a harmonic force F(t) is applied to the object 222, the object 222 vibrates. This harmonic force can be generated by the object 222 itself, such as by the periodic operations of the object 222 (e.g. the combustion cycle of a combustion engine), or by an external force acting on the object (e.g. aerodynamic forces). The harmonic force F(t) can be generally described as a composite of a desired force $f_{tD}$ and an irregular force $f_{tI}$, which may comprise one or more undesired harmonic forces. Accordingly, $$F(t) = f_{tD} + f_{tI}$$

where $$f_{tI} = \sum_{n=1}^{\infty} \Gamma_n$$

and where $\Gamma_n$ is a periodic function having a period T related to frequency ω by $$\omega = \frac{2\pi n}{T}$$

Typically, the first modes of these undesired harmonic forces (i.e. n=1, 3, etc.) are the only harmonic forces large enough to cause concern. Additionally, frequency ω is generally determined by $$\omega = \omega_0(t) + \omega_F(t)\sin(\nu t)$$

where $$\omega_{Min}(t) < \omega_0(t) < \omega_{Max}(t)$$

$$\omega_0(t) > \omega_F(t)$$

where $\omega_F(t)$ is an amplitude of fluctuation of frequency ω and ν is the frequency of fluctuation, and where $0 < \nu < \infty$.

When the casing 224 of the VEHD 220 is securely attached to the object 222, the casing 224 will vibrate with the object 222. As the object 222 and the casing 224 vibrate, the tuned mass 226 and the magnet 228 move rectilinearly along the guide 234. In FIG. 2a this rectilinear movement is in the vertical direction, defined as the x-axis. Accordingly, the position of the object 222 and the casing 224 is denoted by $x_1(t)$, the position of the tuned mass 226 is denoted by $x_2(t)$ and the position of the magnet 228 is denoted by $x_3(t)$. Similarly, the combined mass of the object 222 and the casing 224 is denoted by $m_1$, the mass of the tuned mass 226 is denoted by $m_2$ and the mass of the magnet is denoted by $m_3$. As set out above, the first fixed biasing member 238a has a stiffness coefficient denoted by $c_1$, the second fixed biasing member 238b has a stiffness coefficient denoted by $c_2$ and the third fixed biasing member 238c has a stiffness coefficient denoted by $c_3$, which are all fixed and cannot be easily adjusted. As also set out above, the first adjustable biasing member 240a has an electromagnetic stiffness coefficient denoted by $e_1$, the second adjustable biasing member 240b has an electromagnetic stiffness coefficient denoted by $e_2$ and the third adjustable biasing member 240c has an electromagnetic stiffness coefficient denoted by $e_3$, which are all adjustable.

It is possible to tailor the VEHD 220 for a single frequency or for two different frequencies of the vibrating object 222 by selecting appropriate masses for the tuned mass 226 and the magnet 228 and by selecting appropriate stiffness coefficients for the fixed biasing members 238. However, without the adjustable biasing members 240, the VEHD 220 would tend to perform sub-optimally in its function as a tuned mass damper, a vibration energy harvester or both as the frequency or frequencies of the vibrating object 222 and the harmonic force F(t) changed, since the masses of the tuned mass 226 and the magnet 228 and the stiffness coefficients of the fixed biasing members 238 are set during construction of the VEHD 220 and cannot be easily adjusted.

To accommodate changes in the frequency or frequencies of vibration of the object 222 and the harmonic force F(t), the VEHD 220 includes the adjustable biasing members 240. As outlined above, the electromagnetic stiffness coefficient of each of the adjustable biasing members 240 can be increased or decreased by adjusting the gaps between the permanent magnets 246, 250 in the first electromagnetic arrangement 242 and the second electromagnetic arrangement 244, respectively. By decreasing the gap between the magnets 246 in the first electromagnetic arrangement 242, the electromagnetic stiffness coefficient of the adjustable biasing member 240 can be increased. By decreasing the gap between the magnets 250 in the second electromagnetic arrangement 244, the electromagnetic stiffness coefficient of the adjustable biasing member 240 can be decreased.

Using the adjustable biasing members 240 in the VEHD 220, the combined stiffness coefficient K for each of the biasing assemblies 232 can be adjusted and, accordingly, the performance of the VEHD 220 can be tuned. The combined stiffness coefficient K is determined by the combination of the stiffness coefficient for the fixed biasing member 238 and the electromagnetic stiffness coefficient for the adjustable biasing member 240 in the biasing assembly 232. That is, the combined stiffness coefficient K for each of the biasing assemblies 232 is calculated by $$K = e + c$$

where e denotes the electromagnetic stiffness coefficient of the adjustable biasing member 240 in the biasing assembly 232, and where c denotes the stiffness coefficient of the fixed biasing member 238 in the biasing assembly 232. Accordingly, the combined stiffness coefficient for the biasing assembly 232a is denoted by $K_1$ (where $K_1 = e_1 + c_1$), the combined stiffness coefficient for the biasing assembly 232b is denoted by $K_2$ (where $K_2 = e_2 + c_2$) and the combined stiffness coefficient for the biasing assembly 232c is denoted by $K_3$ (where $K_3 = e_3 + c_3$).

Favorable performance of the VEHD 220 as a vibration energy harvester will generally be achieved when the amplitude of the vibration of the magnet 228 is maximized. Whereas, favorable performance of the VEHD 220 as a tuned mass damper will generally be achieved when the amplitude of the vibration of the object 222 is minimized. Initially, the fixed biasing members 238 of the VEHD 220 may be sized so that generally favorable performance is obtained without increasing or decreasing the combined stiffness coefficients K of the biasing assemblies 232 using the adjustable biasing members. That is, initially, $e_1$, $e_2$ and $e_3$ may all be zero and generally favorable performance may be obtained when:

$$K_1 = m_2 \omega_0^2 = c_1$$

$$K_2 = \frac{m_3 \omega_0^2}{2} = c_2$$

$$K_3 = \frac{m_3 \omega_0^2}{2(1 - \beta_3^2 / 4 m_3 w_0^2)} = c_3$$

where $\omega_0$ is the initial frequency of vibration of the object 222 and $\beta_3$ is the coefficient of viscous friction of the fixed biasing member 238c.

Thereafter, as the frequency of vibration of the object 222 changes, generally favorable performance may be obtained by increasing or decreasing the combined stiffness coefficients K of the biasing assemblies 232 by changing the electromagnetic stiffness coefficients e of the adjustable biasing members. If the frequency of vibration of the object 222 increases (i.e. $\omega_0 < \omega$, where $\omega$ is the frequency of vibration of the object 222 after the change), generally favorable performance may be obtained by setting the combined stiffness coefficients as:

$$K_1 = m_2 \omega_0^2 + 2 m_2 \omega_0 (\omega - \omega_0) = c_1 + e_1$$

$$K_2 = \frac{m_3 \omega_0^2}{2} + m_3 \omega_0 (\omega - \omega_0) = c_2 + e_2$$

$$K_3 = \frac{(m_3 \omega^2)(m_2 \omega^2 - K_1) + K_2(K_1 - (m_2 + m_3)\omega^2)}{m_2 \omega^2 - K_1 - K_2} = c_3 + e_3$$

On the other hand, if the frequency of vibration of the object 222 decreases (i.e. $\omega_0 > \omega$), generally favorable performance may be obtained by setting the combined stiffness coefficients as:

$$K_1 = m_2 \omega_0^2 - 2 m_2 \omega_0 (\omega_0 - \omega) = c_1 - e_1$$

$$K_2 = \frac{m_3 \omega_0^2}{2} - m_3 \omega_0 (\omega_0 - \omega) = c_2 - e_2$$

$$K_3 = \frac{(m_3 \omega^2)(m_2 \omega^2 - K_1) + K_2(K_1 - (m_2 + m_3)\omega^2)}{m_2 \omega^2 - K_1 - K_2} = c_3 + e_3$$

Accordingly, by adjusting the combined stiffness coefficients of the biasing assemblies 232 within the VEHD 220, it may be possible for the VEHD 220 to obtain both favorable performance as a vibration energy harvester and a tuned mass damper, even as the frequency $\omega$ of vibration of the object 222 and the harmonic force F(t) changes.

Figure 3:
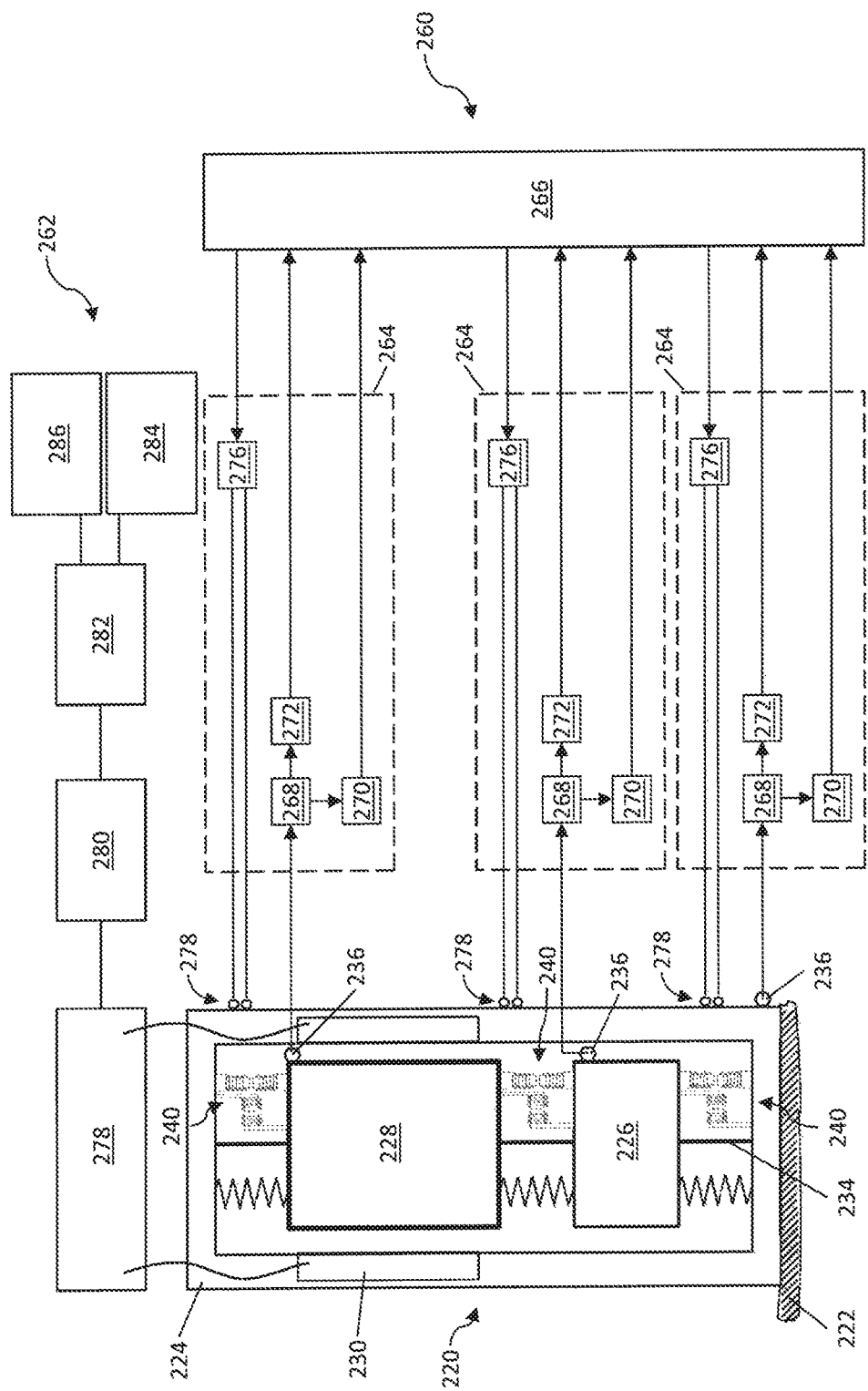

FIG. 3 shows the VEHD 220 with a control system generally identified by reference character 260 and a power system generally identified by reference character 262. The control system 260 is configured to adjust the combined stiffness coefficients of the biasing assemblies 232 by adjusting the electromagnetic stiffness coefficients of the adjustable biasing members 240. Accordingly, the control system 260 comprises a plurality of control sub-systems 264 and a central processor 266.

Each of the control sub-systems 264 is configured to adjust the electromagnetic stiffness coefficient of a corresponding one of the adjustable biasing members 240. Each of the control sub-systems 264 is communicatively coupled to one of the biasing members 240 and to the central processor 266. Each of the control sub-subsystems 264 is also communicatively coupled to a corresponding one of the sensors 236 that is associated with the corresponding biasing member 240 (for example, a sensor 236 that is located in proximity to the corresponding biasing member 240 or a sensor 236 that is connected to the same element as the corresponding biasing member 240). Each of the control sub-systems 264 comprises a Fourier analyzer 268, a frequency comparator 270, a phase comparator 272 and an actuator 276.

The Fourier analyzer 268 is communicatively coupled to the corresponding sensor 236 and is further communicatively coupled to the frequency comparator 270 and the phase comparator 272. The Fourier analyzer 268 receives a motion signal from the corresponding sensor 236 that is representative of the vibrational motion of the element to which the sensor 236 is secured. The Fourier analyzer 268 is configured to perform a Fourier analysis on the motion signal and output a frequency signal and a phase signal to the frequency comparator 270 and the phase comparator 272, respectively. The frequency signal is representative of the immediate frequency of the first mode of vibration of the element to which the corresponding sensor 236 is secured. The phase signal is representative of an immediate phase of maximal amplitude of vibration of the element to which the corresponding sensor 236 is secured.

The frequency comparator 270 is configured to compare the frequency signal to a previously received frequency signal from the Fourier analyzer 268 and output a frequency comparison signal to the central processor 266 that is representative of the change in frequency between the previously received frequency and the immediate frequency of the element to which the corresponding sensor 236 is secured. As will be appreciated, the time interval between when the frequency comparator 270 receives consecutive frequency signals from the Fourier analyzer 268 will influence accuracy of the control system 260. In some embodiments, the time interval X may be selected as $X=2\pi(\omega_0 \times 1000)$ sec., where $\omega_0$ is a base frequency of the object 222.

The phase comparator 272 is configured to compare the phase signal to a previously received phase signal from the Fourier analyzer 268 and output a phase comparison signal to the central processor 266 that is representative of the change in phase between the previously received phase and the immediate phase of the element to which the corresponding sensor 236 is secured. As will be appreciated, the time interval between when the phase comparator 272 receives consecutive phase signals from the Fourier analyzer 268 will influence accuracy of the control system 260. In some embodiments, the time interval X may be selected as $X=2\pi(\omega_0 \times 1000)$ sec., where $\omega_0$ is a base frequency of the object 222.

The central processor 266, which is communicatively coupled to both the frequency comparator 270 and the phase comparator 272 of each control sub-system 264, is further communicatively coupled to the actuator 276 of each control sub-system 264. The central processor 266 is configured to analyze the phase comparison signal and the frequency comparisons signal received from the frequency comparator 270 and the phase comparator 272 of each control sub-system 264 and generate a tuning signal. The central processor 266 outputs the respective tuning signal to the actuator 276 of each control sub-system 264.

The actuator 276 is electrically coupled to the coils 248, 252 of the corresponding adjustable biasing member 240, via contacts 278. As will be appreciated, the electrical connections between the contacts 278 and the coils 248, 252 are omitted in FIG. 3. The actuator 276 receives the tuning signal from the central processor 266, as described above, and activates the coils 248, 252 based on the tuning signal to adjust the electromagnetic stiffness coefficient e of the corresponding adjustable biasing member 240.

As will be appreciated, by receiving the motion signals from the sensors 236 and activating the coils 248, 252 based on the tuning signals generated by the central processor 266, the control sub-system 264 can adjust the gaps between the permanent magnets 246, 250 in the adjustable biasing members 240 and thereby adjust the combined stiffness coefficients K of the biasing assemblies 232. In this manner, the control system 260 can be used to help maintain favorable performance of the VEHD 220, particularly as the frequency of vibration of the object 222 changes. This can help the VEHD 220 to provide both improved vibration damping and improved energy harvesting when compared to VEHDs without adjustable biasing members.

As an example, suppose that the object 222 was vibrating with frequency $\omega_1$ and amplitude $A_1$, and the combined frequency coefficients $K_1$, $K_2$, $K_3$ were properly set by adjusting the adjustable stiffness coefficients $e_1$, $e_2$, $e_3$ to optimize performance of the VEHD 220 as both a vibration energy harvester and a tuned mass damper. If the frequency and the amplitude of the vibrating object 222 change to $\omega_1'$ and $A_1'$, new adjustable stiffness coefficients $e_1'$, $e_2'$, $e_3'$ will be necessary to maintain favorable performance of the VEHD 220. The change to the frequency and the amplitude will be detected by the sensors 236 and will result in new motion signals being output by the sensors 236. These new motion signals will then be received and analyzed by the Fourier analyzers 268 to output new frequency and phase signals. These new frequency and phase signals will be received and compared to the previously registered frequency and phase by the frequency comparators 270 and the phase comparators 272 to output new frequency and phase comparison signals. These new phase comparison signals will be received and analyzed by the central processor 266 to output new tuning signals. These tuning signals will be received and utilized by the actuators 276 to activate the coils 248, 252 as necessary to adjust the gaps between the permanent magnets 246, 250 in the adjustable biasing members 240 to change the adjustable stiffness coefficients to $e_1'$, $e_2'$, $e_3'$ as necessary to maintain favorable performance of the VEHD 220. In this way, the VEHD 220 can be adjusted to help maintain favorable performance as the frequency and amplitude of the vibrating object 222 changes.

FIG. 3 further shows the power system 262. The power system 262 is configured to receive electrical power generated by the VEHD 220 and store and/or distribute the electrical power. Accordingly, the power system 262 comprises a converter 278, an adjuster 280, a distributor 282, storage 284 and one or more electrical loads 286. Although, in other embodiments, electrical power generated by the VEHD 220 may be used to power other electrical loads and/or systems.

As will be appreciated, the VEHD 220 will generate power as the magnet 228 moves within the coil 230. The movement of the magnet 228 creates a changing magnetic flux that induces an electrical current in the coil 230. This electrical current will depend on the strength of the magnetic flux (which is related to the strength of the magnet 228 and the rate of movement of the magnet 228) and the number of turns in the coil 230, at least.

The converter 278 is electrically coupled to the coil 230 of the VEHD 220 and to the adjuster 280. The converter 278 receives electrical power and is configured to convert the electrical power from the VEHD 220, for example from alternating current (AC) to direct current (DC).

The adjuster 280 is electrically coupled to the converter 278 and to the distributor 282. The adjuster 280 receives the electrical power generated by the VEHD 220 from the converter 278 and adjusts the current and/or voltage of the electrical power for use in the remainder of the power system 262.

The distributor 282 is electrically coupled to the adjuster 280, is electrically coupled to the storage 284 and is electrically coupled to the one or more electrical loads 286. The distributor 282 is configured to direct or distribute the electrical power received from the adjuster 280 to the storage 284 and/or one or more of the loads 286. The distributor 282 may direct a portion of the electrical power received from the adjuster 280 to the storage 284, particularly when the electrical power generated by the VEHD 220 exceeds the demands of the one or more loads 286. Alternatively, the distributer 282 may direct all of the electrical power received from the adjuster 280 to the one or more loads 286, or may direct all of the electrical power to the storage 284.

The storage 284 may be further electrically coupled to the one or more loads 286. As will be appreciated, the electrical connection between the storage 284 and the one or more loads 286 is not shown in FIG. 3. The storage 284 is configured to store power generated by the VEHD 220 and may comprise one or more batteries, capacitors or other electrical storage devices.

The one or more loads 286 are electrically coupled to the distributer 282. The loads 286 may be elements of the control system 260, elements of the power system 262, elements of the VEHD 220 (such as the adjustable biasing members 240) or other devices that consume electrical power and are coupled to the power system 262. The loads 286 receive electrical power from the distributer 282 and/or from the storage 284. In some embodiments, the magnet 228 and the coil 230 may generate sufficient electrical power to completely supply the elements of the VEHD 220, the control system 260 and the power system 262 such that no exterior source of electrical power is required. In such embodiments, the VEHD 220, the control system 260 and the power system 262 may be described as self-powering.

Figure 4:
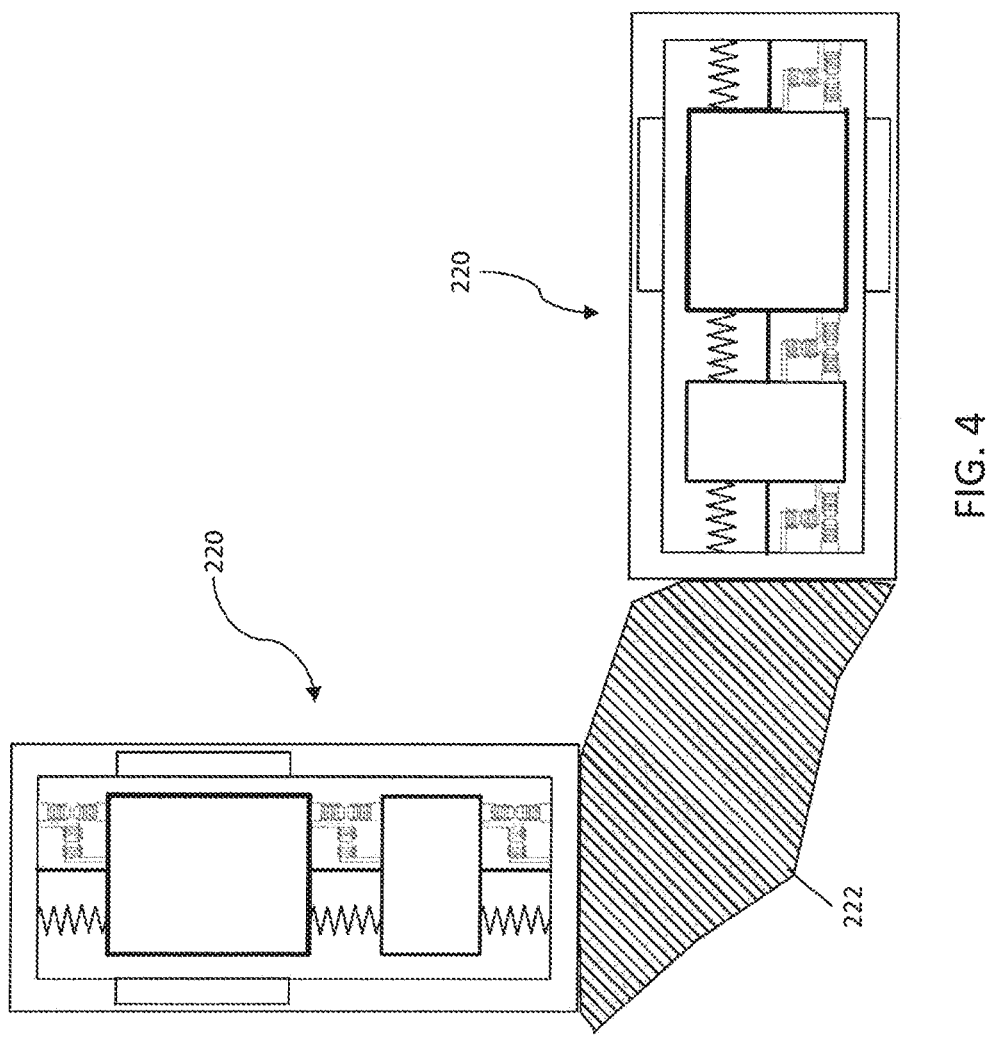
FIG. 4 is a schematic view of an object with a plurality of VEHDs arranged in different orientations.

Although the VEHD 220 has been shown and described above in a vertical orientation and connected to an object 222 that is vibrating vertically, it will be appreciated by a person skilled in the art that the VEHD 220 can be oriented in another suitable direction based on the vibration of the adjoining object 222. In some embodiments, more than one VEHD 220 may be connected to the object 222 and one or more VEHD 220 may be oriented in each direction that the object vibrates in. For example, if the object 222 vibrates in both a horizontal and a vertical direction, two VEHDs 220 may be connected to the object 222, with one of the VEHDs 220 oriented vertically and one of the VEHDs 220 oriented horizontally, as shown in FIG. 4. In yet other embodiments, three or more VEHDs 220 may be connected to the vibrating object 222, with at least one of the VEHDs 220 oriented in each of the Cartesian directions for 3-D space (i.e. the x, y and z directions). As will be appreciated, each of the VEHDs 220 may include a control system 260 and a power system 262. Alternatively, the VEHDs 220 may include a single shared control system 260 and a single shared power system 262.

FIG. 5a shows another VEHD generally identified by reference character 320. The VEHD 320 is the same as the VEHD 220, except for the shape of the casing and the tuned mass and the configuration of one of the biasing assemblies. Similar to VEHD 220, the VEHD 320 is connected to a vibrating object 322 and comprises a casing 324, a tuned mass 326, a magnet 328, a coil 330, a plurality of biasing assemblies 332 and a guide 334. The tuned mass 326 and the magnet 328 are retained by the casing 324 and are movable in a rectilinear direction, along the guide 634. The plurality of biasing assemblies 332 are connected between the casing 324, the tuned mass 326 and the magnet 328 and vibrationally couple the connected elements, such that the vibration of each one of the coupled elements influences the vibration of the other coupled elements. The coil 330 surrounds the magnet 328 and is secured to the casing 324, for example by being embedded in the casing 324. The VEHD 320 may further comprise a plurality of sensors, such as accelerometers (not shown in FIG. 5a).

As mentioned above, the casing 324 is the same as the casing 224, except for the shape. The portion of the casing 324 that surrounds the magnet 228 is narrower than the portion of the casing 324 that surrounds the tuned mass 326. Likewise, the tuned mass 326 is the same as the tuned mass 226, except for the shape. The tuned mass 326 is shorter and wider than the tuned mass 226.

The plurality of biasing assemblies 332 is configured to bias the tuned mass 326 and the magnet 328 towards respective neutral positions (i.e. their positions before vibrating), within the casing 324. The plurality of biasing assemblies 332 comprises a first biasing assembly 332a, a second biasing assembly 332b and a third biasing assembly 332c. The second biasing assembly 332b and the third biasing assembly 332c are the same as the second biasing assembly 232b and the third biasing assembly 232c, respectively, described above. The first biasing assembly 332a is different from the second biasing assembly 332b and the third biasing assembly 332c.

The first biasing assembly 332a is connected between the casing 324 and the tuned mass 326 and is configured to provide a combined stiffness coefficient, as described above. Similar to the first biasing assembly 232a, the first biasing assembly 332a comprises a fixed biasing member 338a and an adjustable biasing member 340a, which are arranged in parallel. The first biasing assembly 332a also further comprises a friction reduction unit 388 that is arranged in series with the fixed biasing member 338a. The fixed biasing member 338a is the same as the fixed biasing member 238a, except the fixed biasing member 338a is shorter. Likewise, the adjustable biasing member 340a is the same as the adjustable biasing member 240a, except the adjustable biasing member 340a is taller. Although, it will be appreciated that in other embodiments the sizes of the fixed biasing member and the adjustable biasing member may be vary.

The friction reduction unit 388 is configured to reduce the friction in the first biasing assembly 332a, which can help to increase the amplitude of vibration of the tuned mass 326 and the magnet 328. As described above, increasing the amplitude of vibration of the magnet 328 can help to increase electrical power generated by the VEHD 320. The friction reduction unit 388 comprises a resistor 390, an inductor 392 and a capacitor 394 (i.e. an RLC circuit) and further comprises a semiconductor device 396 and a power source 398, all of which are electrically coupled together as shown in FIG. 5a. The semiconductor device 396 (such as a tunnel diode) has a falling volt-amp characteristic. Accordingly, the semiconductor device 396 exhibits a negative resistance in the forward region. This falling volt-amp characteristic could be in an S shape (as shown in FIG. 5b) or could be in an N shape (not shown). The value of the volt-amp characteristic $\psi$ at operational point $u_{oper}$ can be tuned using the formula:

$$\psi = -\left[\left(\frac{\beta_0 L}{\beta_2}\right) + R\right]$$

where L is inductance, R is resistance, $\beta_2$ is the coefficient of viscous friction in the first fixed biasing member 338a and $\beta_0$ is the coefficient of mutual conversion mechanical viscous friction into electrical system coordinates (using current base).

The power source 398 in the friction reduction unit 388 can be a battery, an external power source or another suitable source of power, such as the storage 284 in the power system 262, described above. In some embodiments, the power source 398 may be one of the loads in a power system connected to the VEHD, such as one of the loads 286 in the power system 262 described above. The friction reduction unit 388 may be self-powered by the VEHD 320.

Although only the first biasing assembly 332a has been shown and described above as comprising a friction reduction unit 338, it will be appreciated that in other embodiments the second biasing assembly 332b and/or the third biasing assembly 332c may include a friction reduction unit as described above.

FIG. 6 shows a VEHD generally identified by reference character 420. The VEHD 420 is the same as the VEHD 220, except for the arrangement of the magnet and surrounding components as described below. The VEHD 420 is connected to a vibrating object 422 and comprises a casing 424, a tuned mass 426, a plurality of magnets 428, a plurality of coils 430, a plurality of biasing assemblies 432 and a plurality of guides 434. The tuned mass 426 and the magnets 428 are retained by the casing 424 and are movable in a rectilinear direction, with the tuned mass 426 movable along the guide 434. The plurality of biasing assemblies 432 are connected between the casing 424, the tuned mass 426 and the magnets 428 and vibrationally couple the connected elements, such that the vibration of each one of the coupled elements influences the vibration of the other coupled elements. The VEHD 420 may further comprise a plurality of sensors, such as accelerometers (not shown in FIG. 6).

The casing 424 is the same as the casing 224, except for the shape. As shown in FIG. 6, a portion of the casing 424 that surrounds the magnets 428 includes a plurality of internal recesses and each of the magnets 428 is retained within one of the recesses and is surrounded by a one of the coils 430.

The plurality of magnets 428 is configured to provide vibration damping to the object 422 and is configured to generate a changing magnetic flux when vibrating within the VEHD 420. The plurality of magnets 428 comprises a first magnet 428a and a second magnet 428b, which are located adjacent to and in parallel with each other. Each of the magnets 428 is constrained to move in a rectilinear direction (i.e. the vertical direction in FIG. 6) by one of the plurality of guides 434. Each of the magnets 428 is formed of a permanent magnetic material, such as an alloy of neodymium, and has sufficient magnetic field strength to induce a useful electrical current in the surrounding one of the coils 430. Each of the magnets 428 may be a single unitary magnet or may be an array of individual magnets. As shown in FIG. 6, the magnets 428 are identical. Alternatively, the magnets 428 may comprise different configurations.

The plurality of coils 430 is configured to produce a useful electrical current when exposed to the changing magnetic flux generated by the plurality of magnets 428. The plurality of coils 430 comprises a first coil 430a and a second coil 430b. Each of the coils 430 is embedded or otherwise secured within the casing 424 in a position surrounding a corresponding one of the magnets 428. That is, the first coil 430a surrounds the first magnet 428a, and the second coil 430b surrounds the second magnet 428b. Each of the coils 430 comprises a number of turns for generating the useful electrical current when exposed to the changing magnetic flux generated by movement of the corresponding magnet 428 within the coil 430. Each of the coils 430 is formed of an electrically conductive material, such as copper wire, which may be coated to prevent short circuiting of the coil 430.

The plurality of biasing assemblies 432 is configured to bias the tuned mass 426 and the plurality of magnets 428 towards respective neutral positions (i.e. their positions before vibrating) within the casing 424. Each of the biasing assemblies 432 is configured to provide a combined stiffness coefficient, as described above, and comprises a fixed biasing member 438 and an adjustable biasing member 440, which are arranged in parallel. Each of the fixed biasing members 438 and the adjustable biasing members 440 are the same as the fixed biasing member 238 and the adjustable biasing member 240, described above.

The plurality of guides 434 is configured to constrain the movement of the tuned mass 426 and the magnets 428 to a rectilinear direction (i.e. the vertical direction in FIG. 6). As will be appreciated, only the guide 434 for the tuned mass 426 is shown in FIG. 6. The guides 434 for the magnets 428 have been omitted. However, one guide 434 is provided for each corresponding magnet 428a, 428b in the VEHD 420. Each of the guides 434 is secured to the casing and comprises an elongate rod, which passes through a void (not shown) in the corresponding tuned mass 426, magnet 428a or magnet 428b. Although, other suitable constructions for the guides 434 will be apparent to those skilled in the art.

As will be appreciated, by providing a plurality of coils and magnets, the VEHD 420 may be more flexible to changing frequency in the vibrations of the object 422 and may be more efficient than a VEHD with a single magnet and coil. Additionally, in some embodiments, each of the coils may be sized to provide a specific amount of electrical energy required by a particular load, which may simplify the power system connected to the VEHD 420.

Figure 7:
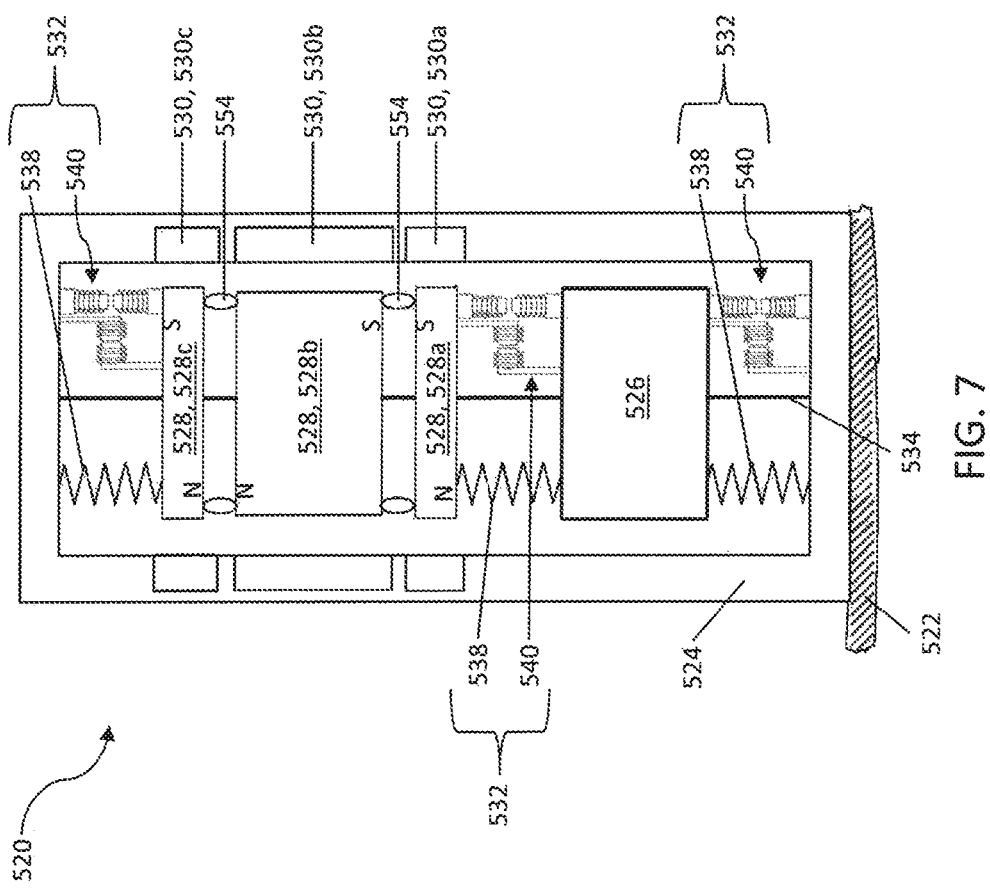
FIG. 7 is a schematic view of a VEHD having a plurality of magnets arranged in series.

FIG. 7 shows another embodiment of a VEHD generally identified by reference character 520. The VEHD is the same as the VEHD 220, except for the arrangement of the magnet and the coil. The VEHD 520 is connected to a vibrating object 522 and comprises a casing 524, a tuned mass 526, a plurality of magnets 528, a plurality of inter-magnet cushions 554, a plurality of coils 530, a plurality of biasing assemblies 532 and a guide 534. The tuned mass 526 and the magnets 528 are retained by the casing 524 and are movable in a rectilinear direction, along the guide 534. The plurality of biasing assemblies 532 are connected between the casing 524, the tuned mass 526 and the magnet 528 and vibrationally couple the connected elements, such that the vibration of each one of the coupled elements influences the vibration of the other coupled elements. The VEHD 520 may also comprise a plurality of sensors, such as accelerometers (not shown in FIG. 7).

The casing 524 is the same as the casing 224. The tuned mass 526 is the same as the tuned mass 226. The plurality of biasing assemblies 532 is the same as the plurality of biasing assemblies 232 and each comprises a fixed biasing member 538, which is the same as the fixed biasing member 238, and an adjustable biasing member 540, which is the same as the adjustable biasing member 240, described above.

The plurality of magnets 528 is configured to provide vibration damping to the object 522 and is configured to generate a changing magnetic flux when vibrating within the VEHD 520. The plurality of magnets 528 comprises a first magnet 528a, a second magnet 528b and a third magnet 528c, which are all connected in series. The first magnet 528a is positioned between the tuned mass 526 and the second magnet 528a. The first magnet 528a is connected to the tuned mass 526 by one of the biasing assemblies 532 and is connected the second magnet 528b by one of the inter-magnet cushions 554. The second magnet 528b is positioned between the first magnet 528a and the third magnet 528c. The second magnet 528b is connected to the first magnet 528a and the third magnet 528c by the plurality of inter-magnet cushions 554. The third magnet 528c is positioned adjacent the second magnet 528b, opposite the first magnet 528a. The third magnet 528c is connected to the second magnet 528b by one of the inter-magnet cushions 554 and is connected to the casing 524, opposite the second magnet 528b, by one of the biasing assemblies 532. The plurality of magnets 528 is aligned such that the same poles face each other in adjacent magnets 528 (e.g. the south pole of the first magnet 528a faces the south pole of the second magnet 528b and the north pole of the second magnet 528b faces the north pole of the third magnet 528c, as shown in FIG. 7). This creates a repulsive force between the magnets 528 and helps to keep the magnets 528 from contacting each other. The magnets 528 are constrained to move in a rectilinear direction (i.e. the vertical direction in FIG. 7) by the guide 534. The magnets 528 are formed of a permanent magnetic material, such as an alloy of neodymium, and have sufficient magnetic field strength to induce an electrical current in the coils 530. Each of the magnets 528 may be a single unitary magnet or may be an array of individual magnets.

The plurality of coils 530 is configured to produce a useful electrical current when exposed to the changing magnetic flux generated by the plurality of magnets 528. The plurality of coils 530 comprises a first coil 530a, a second coil 530b and a third coil 530c. Each of the coils 530 is embedded or otherwise secured within the casing 524 and surrounds a corresponding one of the magnets 528. That is, the first coil 530a surrounds the first magnet 528a, the second coil 530b surrounds the second magnet 528b and the third coil 530c surrounds the third magnet 528c. Each of the coils 530 comprises a number of turns for generating the useful electrical current when exposed to the changing magnetic flux generated by movement of the corresponding magnet 528 within the coil 530. Each of the coils 530 is formed of an electrically conductive material, such as copper wire, which may be coated to prevent short circuiting of the coil 530.

The plurality of inter-magnet cushions 554 is configured to provide cushioning between the magnets 528 and helps prevent direct contact of the magnets 528. The inter-magnet cushions 554 have toroidal shape (such as an O-ring). In other embodiments, the inter-magnetic cushions may be other suitable shapes, such as disks. The inter-magnetic cushions 544 are formed of rubber or other suitable material. One or more of the inter-magnet cushions 554 may be included between each of the adjacent magnets 528. As will be appreciated, by providing a plurality of coils and magnets with inter-magnet cushions, the VEHD 520 may be more flexible than a VEHD with a single magnet and coil and no inter-magnet cushions.

FIG. 8a shows another embodiment of a VEHD generally identified by reference character 620. The VEHD 620 is the same as the VEHD 220, except for the arrangement of the tuned mass and surrounding elements in the VEHD, such as the first and second biasing assemblies. The VEHD 620 is connected to a vibrating object 622 and comprises a casing 624, a magnet 628, a coil 630, a vibro-impact assembly 688, a plurality of biasing assemblies 632 and a guide 634. The tuned mass 626 and the magnet 628 are retained by the casing 624 and are movable in a rectilinear direction, along the guide 634. The plurality of biasing assemblies 632 is connected between the casing 624, the tuned mass 626 and the magnet 628 and vibrationally couples the connected elements, such that the vibration of each one of the coupled elements influences the vibration of the other coupled elements. The coil 630 surrounds the magnet 628 and is secured to the casing 624, for example by being embedded in the casing 624. The VEHD 620 further comprises a plurality of sensors 636.

The casing 624 is the same as the casing 224. The magnet 628 is the same as the magnet 28. The coil 630 is the same as the coil 230.

The vibro-impact assembly 688 is configured to provide vibration damping to the object 622 and to amplify the vibrations of the magnet 628 within the coil 630. The vibro-impact assembly 688 comprises a tuned mass 626, a container 690, an amplitude tuner 692 and a density regulator 694. The tuned mass 626 is positioned within the container 690 and is free to move along the guide 634 during vibration of the VEHD 620. The container 690 is secured to the casing 624 and is filled by a fluid, such as a liquid or a gas, which provides resistance to tuned mass 626 during vibration within the container 690. The amplitude tuner 692 is at least partially positioned within the container 690 and is adjustable to increase or decrease the maximum amplitude with which the tuned mass 626 can vibrate within the container 690. To adjust the position of the amplitude tuner 692 and thereby increase or decrease the maximum amplitude the tuned mass 626 can vibrate, the connection between the amplitude tuner 692 and the container 690 is threaded. Although, in other embodiments the amplitude tuner 692 may not be threaded and the position of the amplitude tuner 692 may be adjusted using other means, as will be appreciated. The density regulator 694 is in fluid communication with the container 690 and is operable to increase or decrease the density of the fluid in the container 690, such as by pumping additional fluid into the container 690 from a fluid reservoir (not shown). Although, in other embodiments the density regulator 694 may increase or decrease the density of the fluid in the container 690 by other means, as will be appreciated.

The plurality of biasing assemblies 632 comprises a second biasing assembly 632b and a third biasing assembly 632c. As will be appreciated, the embodiment of the VEHD 630 shown in FIG. 8a does not include a first biasing assembly, in contrast to the VEHDs described above. The third biasing assembly 632c is the same as the third biasing assembly 232c, described above. The second biasing assembly 632b comprises a pair of fixed biasing member 638, which are connected between the tuned mass 626 and the magnet 628 and vibrationally couple the magnet 628 to the tuned mass 626, such that the vibration of the tuned mass 626 influences the vibration of the magnet 628. The second biasing assembly 632b is configured to transmit force between the tuned mass 626 and the magnet 628, which can help to increase the amplitude of vibration of the magnet 628 and thereby increase electrical power generated by the VEHD 620, as described above.

The guide 634 is configured to constrain the movement of the tuned mass 626 and the magnet 628 to a rectilinear direction (i.e. the vertical direction in FIG. 8a). Accordingly, the guide 634 is secured within the casing 624 and extends between a first side of the casing 624 proximal the object 622 and a second side of the casing 624, opposite the first side and distal from the object 622. The guide 634 comprises an elongate rod, which passes through corresponding voids (not shown) in the tuned mass 626, the magnet 628 and the container 690. Although, other suitable constructions for the guide 634 will be apparent to those skilled in the art.

The plurality of sensors 636 is configured to detect various operating characteristics of the elements of the VEHD 620 (such as the velocity, acceleration, position, density, etc.), which can be used to help control the VEHD 620. Accordingly, the plurality of sensors 636 comprises a first sensor 636a secured to the casing 624 and/or the object 622, a second sensor 636b secured to the container 690 and a third sensor 636c secured to the magnet 628. The first sensor 636a and the third sensor 636c are the same as the first sensor 236a and the third sensor 236c, described above. The second sensor 636b is configured to output a density signal that is representative of the density of the fluid in the container 690.

During vibration of the object 622, the tuned mass 626 vibrates rectilinearly within the container 690 and collides within opposite interior surfaces of the container 690 (e.g. the top interior surface and bottom interior surfaces in FIG. 8a). The force of these impacts is in an opposite phase (i.e. anti-phase) to the external force acting on the object 622 and helps to reduce the amplitude of the object's vibrations. These impact forces are transferred to the magnet 628 by the second biasing assembly 632b and cause the magnet 628 to oscillate within the coil 630, which generates electrical power as described above.

The VEHD 620 is at least partially self-tuning to the frequency of vibration of the object 622 due to the self-tuning nature of vibro-impact assemblies in general, as will be appreciated by a person skilled in the art. This self-tuning feature operates when the frequency of vibration of the object 622 varies but the amplitude of the vibration of the object 622 is relatively constant. Accordingly, when the amplitude of the vibration of the object 622 changes, the vibro-impact assembly 688 must be readjusted. This adjustment can include increasing or decreasing the density of the fluid in the container 690.

FIG. 8b shows a control system for the vibro-impact assembly 688 of the VEHD 620, the control system being generally identified by reference character 660. The control system 660 is configured to adjust the vibro-impact assembly 688, particularly the density of the fluid within the container 690 and the maximum amplitude with which the tuned mass 626 can vibrate within the container 690. The control system 660 comprises a Fourier analyzer 668, a frequency comparator 670, an amplitude comparator 672, a central processor 666 and a plurality of actuators 674. The control system 660 is communicatively coupled to the sensors 636a, 636b, the amplitude tuner 692 and the density regulator 694.

The Fourier analyzer 668 is communicatively coupled to the sensor 636a and is further communicatively coupled to the frequency comparator 670 and the amplitude comparator 672. The Fourier analyzer 668 receives a motion signal from the sensor 636a that is representative of the vibrational motion of the object 622 and/or the casing 624. The Fourier analyzer 668 is configured to perform a Fourier analysis on the motion signal and output a frequency signal and an amplitude signal to the frequency comparator 670 and the amplitude comparator 672, respectively. The frequency signal is representative of the immediate frequency of the first mode of vibration of the object 622 and/or the casing 624. Whereas, the amplitude signal is representative of an immediate maximum amplitude of vibration of the object 622 and/or the casing 624.

The frequency comparator 670 is communicatively coupled to the Fourier analyzer 668 and the central processor 666. The frequency comparator 670 receives the frequency signal from the Fourier analyzer 668. The frequency comparator 670 is configured to compare the frequency signal to a previously received frequency signal from the Fourier analyzer 668 and output a frequency comparison signal that is representative of the change in frequency between the previously received frequency and the immediate frequency of vibration of the object 622 and/or the casing 624. As will be appreciated, the time interval between when the frequency comparator 670 receives consecutive frequency signals from the Fourier analyzer 668 will influence accuracy of the control system 660. In some embodiments, the time interval X may be selected as $X=2\pi(\omega_0 \times 1000)$ sec, where $\omega_0$ is a base frequency of the object 622.

The amplitude comparator 672 is communicatively coupled to the Fourier analyzer 668 and the central processor 666. The amplitude comparator 672 receives the amplitude signal from the Fourier analyzer 668. The amplitude comparator 672 is configured to compare the amplitude signal to a previously received amplitude signal from the Fourier analyzer 668 and output an amplitude comparison signal that is representative of the change in amplitude between the previously received amplitude and the immediate amplitude of vibration of the object 622 and/or the casing 624. As will be appreciated, the time interval between when the amplitude comparator 672 receives consecutive amplitude signals from the Fourier analyzer 668 will influence accuracy of the control system 660. In some embodiments, the time interval X may be selected as $X=2\pi(\omega_0 \times 1000)$ sec, where $\omega_0$ is a base frequency of the object 622.

The central processor 666 is communicatively coupled to the frequency comparator 670, the amplitude comparator 672, the second sensor 636b and the actuators 674. The central processor 666 receives the frequency comparison signal from the frequency comparator 670, receives the amplitude comparison signal from the amplitude comparator 672 and receives the density signal from the second sensor 636b. The central processor 666 is configured to analyze the received signals and output an amplitude tuning signal and a density tuning signal to the actuators 674.

The plurality of actuators 674 is communicatively coupled to the central processor 666. The plurality of actuators 674 comprises an amplitude actuator 674a and a density actuator 674b, which are communicatively coupled to the amplitude tuner 692 and the density regulator 694, respectively. The amplitude actuator 674a receives the amplitude tuning signal from the central processor 666 and is configured to actuate the amplitude tuner 692 to adjust the maximum amplitude with which the tuned mass 626 can vibrate within the container 690. To actuate the amplitude tuner 692, the amplitude actuator 674a may rotate the amplitude tuner 692 to adjust the position of the amplitude tuner 692 with respect to the container 690 by way of the threaded connection therebetween. Although, in other embodiments the amplitude actuator 674a may adjust the position of the amplitude tuner 692 using other methods and the amplitude tuner 692 may not be threaded, as will be appreciated. The density actuator 674b receives the density tuning signal from the central processor 666 and is configured to actuate the density regulator 694 to adjust the density of the fluid in the container 690.

Although the amplitude tuner 692 has been shown and described as being actuated by the amplitude actuator 674a, it will be appreciated that in other embodiments the amplitude tuner 692 may comprise a threaded stud that can be manually rotated to increase or decrease the maximum amplitude with which the tuned mass 626 can vibrate within the container 690. In such other embodiments, the control system 660 may not include the amplitude actuator 674a.

Figure 9:
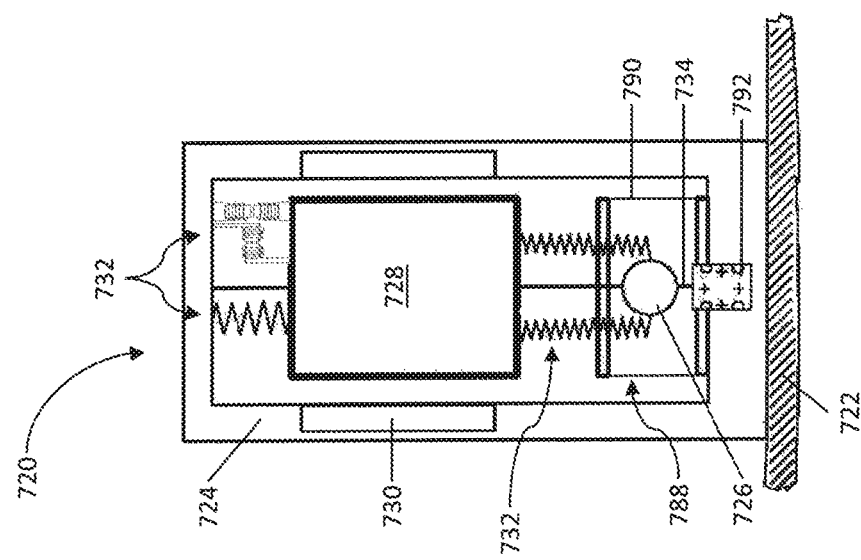
FIG. 9 is a schematic view of a VEHD having an alternative vibro-impact assembly.

FIG. 9 shows another embodiment of a VEHD generally identified by reference character 720. The VEHD 720 is the same as the VEHD 620, except for the arrangement of the vibro-impact assembly. The VEHD 720 is connected to a vibrating object 722 and comprises a casing 724, a magnet 728, a coil 730, a vibro-impact assembly 788, a plurality of biasing assemblies 732 and a guide 734.

The casing 724 is the same as the casing 624. The magnet 728 is the same as the magnet 628. The coil 730 is the same as the coil 630. The plurality of biasing assemblies 732 is the same as the plurality of biasing assemblies 632. The guide 734 is the same as the guide 634.

The vibro-impact assembly 788 is configured to provide vibration damping to the object 722 and to amplify the vibrations of the magnet 728 within the coil 730. The vibro-impact assembly 788 comprises a tuned mass 726, a container 790 and an amplitude tuner 792. The tuned mass 726 is positioned within the container 790 and is free to move along guide 734 during vibration of the VEHD 720. The container 790 is secured to the casing 724 and is filled by a fluid, such as a liquid or a gas, which provides resistance to tuned mass 726 during vibration within the container 790. The amplitude tuner 792 is at least partially positioned within the container 790 and is adjustable to increase or decrease the maximum amplitude with which the tuned mass 726 can vibrate within the container 790. In this embodiment, the amplitude tuner 792 is a sliding piston that can be extended or retracted from the casing 724 by an actuator (not shown), which may include a motor and gears and/or may be electromagnetic. In other embodiments, the vibro-impact assembly 788 may further comprise a density regulator, such as density regulator 694 described above.

Figure 10:
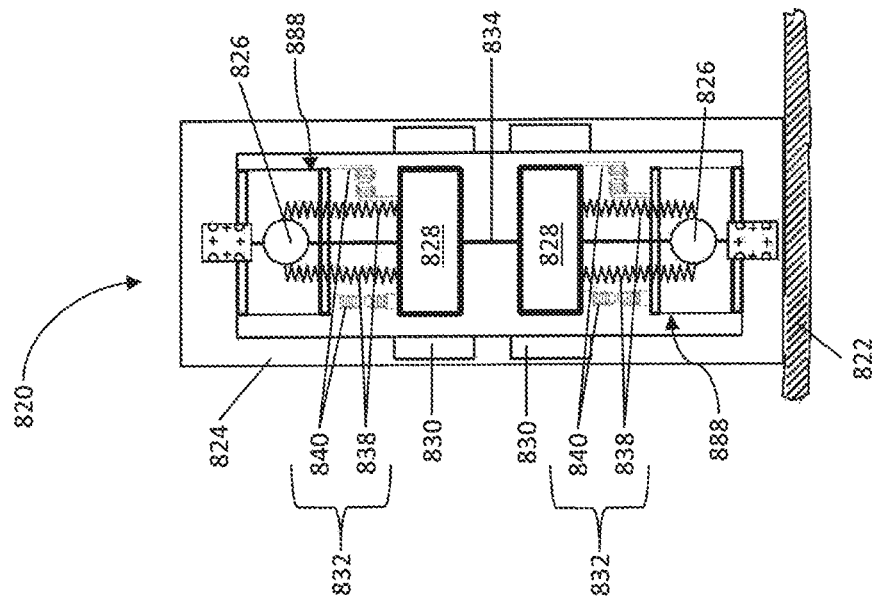
FIG. 10 is a schematic view of a VEHD having a pair of magnets and a pair of vibro-impact assemblies.

FIG. 10 shows another embodiment of a VEHD generally identified by reference character 820. The VEHD 820 is particularly suited for situations where the external force causing vibration is multi-harmonic by nature. The VEHD 820 comprises two opposing halves, which are arranged vertically in mirror image alignment. Each of the halves of the VEHD 820 is the same as the VEHD 720, except the casing for the two halves is integrated and the biasing assemblies are different, as described below. The VEHD 820 is connected to a vibrating object 822 and comprises a casing 824, a pair of magnets 828, a pair of coils 830, a pair of vibro-impact assemblies 888, a plurality of biasing assemblies 832 and a guide 834.

Each of the magnets 828 is the same as the magnet 728. Each of the coils 830 is the same as the coil 730. Each of the vibro-impact assemblies 888 is the same as the vibro-impact assembly 788. Although the vibro-impact assemblies 888 are identical in this embodiment, it will be appreciated that in other embodiments the vibro-impact assemblies may not be identical and may have different sizes and/or shapes from each other.

The casing 824 is configured to retain the various components of the VEHD 820 and is configured to securely attach to the vibrating object 822. The casing 824 is formed of a non-magnetic material, such as non-magnetic metal, plastic or other suitable material. The casing 824 may be cylindrically shaped or may be another suitable shape, as will be appreciated. Although a casing 824 is shown and described herein, it will be appreciated by those skilled in the art that other suitable support structures may be used, such as a frame. In the embodiment shown in FIG. 10, each of the coils 830 is embedded or otherwise secured to the casing 824 in a position surrounding a corresponding one of the magnets 828. Although, in other embodiments a single coil may surround both magnets.

The plurality of biasing assemblies 832 comprises a pair of biasing assemblies 832. Each of the biasing assemblies 832 comprises a pair of fixed biasing members 838 and an adjustable biasing member 840, arranged in parallel. The adjustable biasing members 840 are the same as the adjustable biasing members 240, described above. Each of the fixed biasing members 838 is connected between a corresponding one of the magnets 828 and a corresponding one of the tuned masses 826 and vibrationally couples the magnet 828 to the tuned mass 826, such that the vibration of the tuned mass 826 influences the vibration of the magnet 828. Similarly, each of the adjustable biasing members 840 is connected between a corresponding one of the magnets 828 and a corresponding one of the vibro-impact assemblies 888 and vibrationally couples the magnet 828 to the vibro-impact assembly 888, such the vibration of the vibro-impact assembly 888 influences the vibration of the magnet 828. Each of the biasing assemblies 832 is configured to transmit force between the corresponding tuned mass 826, the magnet 828 and the vibro-impact assembly 888, which can help to increase the amplitude of vibration of the magnet 828 and thereby increase electrical power generated by the VEHD 820.

The guide 834 is configured to constrain the movement of the tuned mass 826 and the magnets 828 to a rectilinear direction (i.e. the vertical direction in FIG. 10). Accordingly, the guide 834 is secured within the casing 824 and extends between a first side of the casing 824 proximal the object 822 and a second side of the casing 824, opposite the first side and distal from the object 822. The guide 834 comprises an elongate rod, which passes through corresponding voids (not shown) in the tuned mass 826, the magnet 828 and the vibro-impact assembles 888. Although, other suitable constructions for the guide 834 will be apparent to those skilled in the art.

Figure 11B:
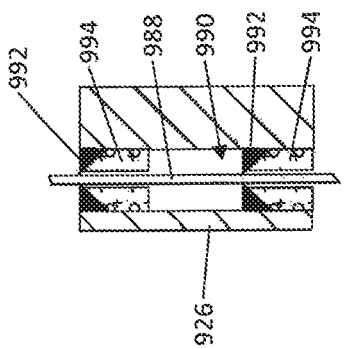
Figure 11A:
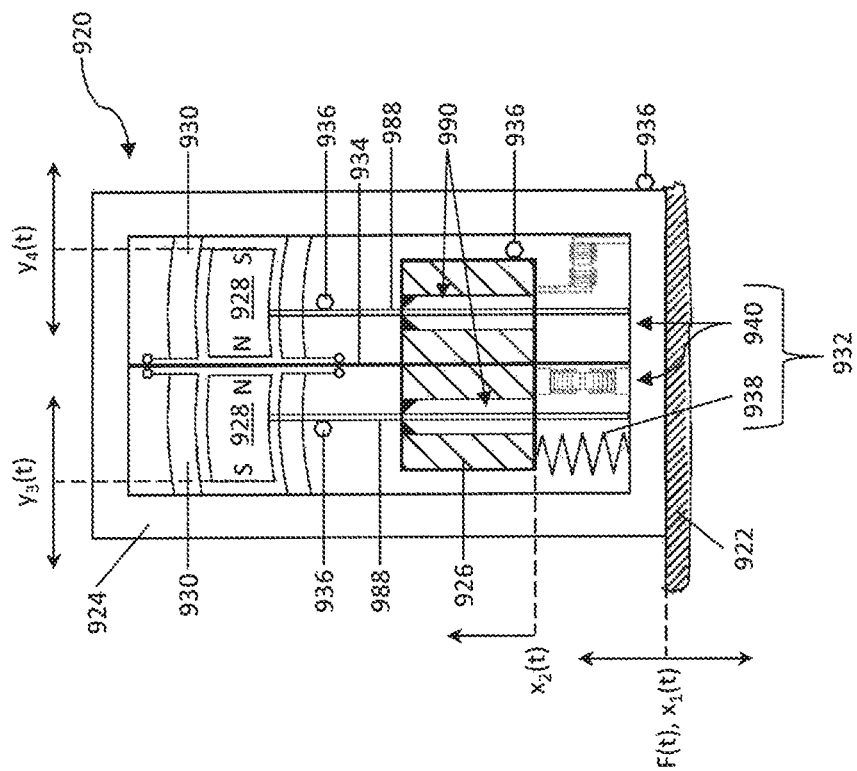
FIG. 11a is a schematic view of a VEHD using parametric resonance.

FIG. 11a shows another embodiment of a VEHD generally identified by reference character 920. The VEHD 920 is configured to provide both vibration damping and energy harvesting, over a broad range of frequencies. The VEHD 920 is configured to promote parametric resonance to increase energy harvesting, as described below. The VEHD 920 is attached to a vibrating object 922 and comprises a casing 924, a tuned mass 926, a pair of magnets 928, a pair of coils 930, a biasing assembly 932, a guide 934 and a pair of cantilever beams 988. The tuned mass 926 and the magnets 928 are retained by the casing 924. The tuned mass 926 is moveable in a rectilinear direction, along the guide 934, and the magnets 928 are movable in a transverse direction. Each of the magnets 928 is movable within a respective one of the coils 930. As will be appreciated, the transverse direction is generally perpendicular to the rectilinear direction, which is the vertical direction in FIG. 11a. The biasing assembly 932 is connected between the casing 924 and the tuned mass 926 and vibrationally couples the casing 924 and the tuned mass 926, such that the vibration of the casing 924 influences the vibration of the tuned mass 926 and vice versa. Each of the cantilever beams 988 is connected between the casing 924 and one of the magnets 928 and passes through the tuned mass 926. The cantilever beams 988 vibrationally couple the magnets 928 to the tuned mass 926, such that the vibration of the tuned mass 926 influences the vibrations of the magnets 928, as described below. The cantilever beams 988 further vibrationally couple the magnets 928 to the casing 924, such that the vibration of the casing 924 influences the vibrations of the magnets 928. The coils 930 surround the magnets 928 and are secured to the casing 924. As will be appreciated, the tuned mass 926, the magnets 928, the biasing assembly 932 and the cantilever beams 988 generally form a vibration damper in the VEHD 920, while the magnets 928 and the coils 930 generally form an energy harvester. The VEHD 920 may further comprise a plurality of sensors 936, such as accelerometers, for controlling the VEHD 920, as described below.

The casing 924 is configured to retain the various components of the VEHD 920 and is configured to securely attach to the vibrating object 922. The casing 924 is formed of a non-magnetic material, such as non-magnetic metal, plastic or other suitable material. The casing 924 may be cylindrically shaped or may be another suitable shape, as will be appreciated. Although a casing 924 is shown and described herein, it will be appreciated by those skilled in the art that other suitable support structures may be used, such as a frame.

The tuned mass 926 is configured to provide vibration damping to the object 922 and to amplify the vibrations of the magnets 928 within the coils 930. The tuned mass 926 is constrained to move in the rectilinear direction (i.e. in a single direction, such as the vertical direction in FIG. 11a) by the guide 934. The tuned mass 926 has a mass that is sufficient to reduce undesired vibration in the object 922. The tuned mass 926 includes a pair of slots 990. Each of the cantilever beams 988 extends through a respective one of the slots 990 in the tuned mass 926. Each of the slots 990 includes at least one clamp 992 that slidingly engages the cantilever beam 988 extending through the slot 990 (as shown in FIG. 11b). Each of the clamps 992 is movable within its respective slot 990 between an uppermost position (as shown at the top of FIG. 11b) and a lowermost position (as shown at the bottom of FIG. 11b). Each of the slots 990 includes at least one drive mechanism 994 that can be used to change the position of the guide 992 along the cantilever beam 988 within the slot 990. In this embodiment the drive mechanism 994 includes a motor and gears (not shown). In alternative embodiments, the drive mechanism 994 may be electromagnetically driven or driven by other suitable means. The tuned mass 926 is formed of a non-magnetic material, such as a non-magnetic metal, and may be cylindrically shaped or another suitable shape, as will be appreciated.

The magnets 928 are configured to provide vibration damping to the object 922 and are configured to generate a changing magnetic flux when vibrating within the VEHD 920. Each of the magnets 928 is secured to a free end of one of the cantilever beams 988. The magnets 928 move in the transverse direction (e.g. a generally horizontal direction in FIG. 11a) within the coils 930. The magnets 928 are formed of a permanent magnetic material, such as an alloy of neodymium, and have sufficient magnetic field strength to induce a useful electrical current in the coils 930. Each of the magnets 928 may be a single unitary magnet or may be an array of individual magnets. The magnets 928 are of equal weight and configuration. The magnets 928 are horizontally aligned with the same poles facing each other (e.g. the north pole of one magnet 928 faces the north pole of the other magnet 928, as shown in FIG. 11a) to generate a repulsive force between the magnets 928. During operation, the magnets 928 vibrate oppositely in the transverse direction (e.g. the generally horizontal direction in FIG. 11a), which is defined as the y-axis in this embodiment. Accordingly, as one of the magnets 928 moves in a positive y-direction, the other magnet 928 moves in a negative y-direction. The position of one of the magnets 928 can be denoted by $y_3(t)$ and the position of the other magnet 928 can be denoted by $y_4(t)$. As will be appreciated, the opposing vibrations of the magnets 928 will generally produce opposite forces acting on the casing 924, which helps to mitigate any transverse vibrations from the magnets 928 being transmitted to the casing 924 and the object 922.

The coils 930 are configured to produce the useful electrical current when exposed to the changing magnetic flux generated by the magnet 928. The coils 930 are secured within the casing 924 in a position surrounding the magnets 928 and terminate in a pair of electrical contacts for connecting to a power system or other electrical load. Each of the coils 930 comprises a number of turns for generating the useful electrical current when exposed to the changing magnetic flux. The coils 930 are formed of an electrically conductive material, such as copper wire, which may be coated to prevent short circuiting of the coil 930.

The biasing assembly 932 is the same as the biasing assembly 232a, described above, and comprises a fixed biasing member 938 and an adjustable biasing member 940, which are arranged in parallel. As described above, the adjustable biasing member 940 comprises a pair of electromagnetic arrangements and the fixed biasing member 938 comprises a mechanical and/or hydraulic or pneumatic spring. The fixed biasing member 938 is configured to provide a generally fixed stiffness coefficient, and the adjustable biasing member 940 is configured to provide an adjustable stiffness coefficient.

The guide 934 is configured to constrain the movement of the tuned mass 926 to a rectilinear direction (e.g. the vertical direction in FIG. 11a). Accordingly, the guide 934 is secured within the casing 924 and extends between a first side of the casing 924 proximal to the object 922 and a second side of the casing 924, opposite the first side and distal from the object 922. The guide 934 comprises an elongate rod, which passes through a corresponding void (not shown) in the tuned mass 926. Although, other suitable constructions for the guide 934 will be apparent to those skilled in the art.

The cantilever beams 988 are configured to act as biasing members, or springing elements, for the magnets 928. The cantilever beams 988 are symmetrically positioned about the centerline of the tuned mass 926 and are identical. Each of the cantilever beams 988 includes a fixed end, which is secured to the casing 924, and an opposite free end, which is secured to a corresponding one of the magnets 928. The cantilever beams 988 vibrationally couple the magnets 928 to the tuned mass 926, such that vibration of the tuned mass 926 influences the vibrations of the magnet 928 by adjusting the length of the free end of the cantilever beams 988 (i.e. the free length of the cantilever beams 988). Although cantilever beams are shown and described in this embodiment, in other embodiments the cantilever beams 988 may be replaced with other suitable springing elements. A vibrations sensor 936 (e.g. an accelerometer) is secured to the free end of each of the cantilever beams 988 and may be used to control the VEHD 920 as described below.

Figure 11C:
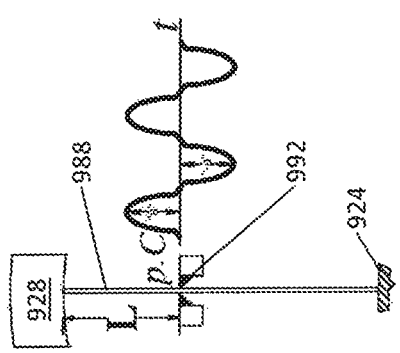

When the casing 924 of the VEHD 920 is securely attached to the object 922, the casing 924 will vibrate with the object 922. As the object 922 and the casing 924 vibrate in response to a force F(t) and with a position denoted by $x_1(t)$, the tuned mass 926 moves rectilinearly along the guide 934 and with a position denoted by $x_2(t)$. In FIG. 11a this rectilinear movement is in the vertical direction, defined as the x-axis. As the tuned mass 926 vibrates about its initial rest position (i.e. the neutral position), the point of contact between the clamps 992 and the cantilever beams 988 moves. This moving point of contact changes the free length of each of the cantilever beams 988, to which the magnets 928 are secured. As shown in FIG. 11c, the free length of each of the cantilever beams 988 is denoted by L and is the distance from the connection between the cantilever beam 988 and the magnet 928 to the point of contact (p.C) between the cantilever beam 988 and the clamp 992 nearest to the magnet 928.

For a cantilever beam with a rectangular cross-section, the stiffness coefficient $c_3$ is proportional to $1/L^3$. Accordingly, if the mass of each of the magnets 928 is denoted by $m_3$, the natural frequency of vibration for the magnet 928 attached to the corresponding cantilever beam 988 will be equal to:

$$\omega_N = \sqrt{\frac{c_3}{m_3}}$$

If the natural frequency of the tuned mass 926 vibration is the same as the casing 924 and the object 922 vibration, denoted by $\omega_0$, then the vibration of the point of contact (p.C) can be represented by the formula a sin $\omega_0 t$ (as shown in FIG. 11c), where a is the amplitude of these vibrations and where a/L is significantly less than 1, as will be appreciated. Accordingly, the stiffness coefficient $c_3$ would oscillate over time as defined by the equation:

$$c_3(t) = c_3\left[1 - 3\left(\frac{a}{L}\right)\sin\omega_o t\right]$$

Parametric resonance in the vibrating magnets 928 attached to the corresponding cantilever beams 988 occurs when the frequency of vibration e of the tuned mass 926 is equal to $2\omega_N/n$, where n=1, 2, 3 . . . and where $\omega_N$ is the natural frequency of vibration of one of the magnets 928 attached to the corresponding cantilever beam 988, as set out above. Controlling the frequency of vibration of the tuned mass 926 to maintain parametric resonance, based on the above equations, can help to increase the amplitude of vibration of the magnets 928 within the coils 930 and, accordingly, can help to increase the amount of electrical energy generated by the VEHD 920.

FIG. 12 shows the VEHD 920 with a control system generally identified by reference character 960 and a power system generally identified by reference character 962. The power system 962 is the same as the power system 262, described above, and is electrically coupled to both of the coils 930 of the VEHD 920. The control system 960 is configured to adjust the combined stiffness coefficient of the biasing assembly 932, by adjusting the electromagnetic stiffness coefficient of the adjustable biasing member 940. The control system 960 is further configured to adjust the position of the clamps 992 and drive mechanisms 994 within the tuned mass 926. The control system 960 comprises a base Fourier analyzer 964, a tuned mass Fourier analyzer 966, a beam Fourier analyzer 968, a frequency comparator 970, an amplitude comparator 972, a tuning analyzer 974, a biasing member actuator 976, a drive mechanism actuator 978 and a central processor 980.

The base Fourier analyzer 964 is communicatively coupled to the sensor 936 that is secured to the casing 924 and/or the object 922. The base Fourier analyzer 964 is further communicatively coupled to the amplitude comparator 972 and the frequency comparator 970. The base Fourier analyzer 964 receives a motion signal from the sensor 936 that is representative of the vibration motion of the casing 924 and/or the object 922. The base Fourier analyzer 964 is configured to perform a Fourier analysis on the motion signal and output a frequency signal and an amplitude signal. The frequency signal is output to the frequency comparator 970 and the amplitude signal is output to the amplitude comparator 972. The frequency signal is representative of the immediate frequency of the first mode of vibration of the casing 924 and/or the object 922, i.e. the first or lowest harmonic of the vibration. Whereas, the amplitude signal is representative of the immediate value of maximum amplitude of the first mode of vibration of the casing 924 and/or the object 922, i.e. the first or lowest harmonic of the vibration.

The tuned mass Fourier analyzer 966 is communicatively coupled to the sensor 936 that is secured to the tuned mass 926. The tuned mass Fourier analyzer 966 is further communicatively coupled to the amplitude comparator 972 and the frequency comparator 970. The tuned mass Fourier analyzer 966 receives a motion signal from the sensor 936 that is representative of the vibration motion of the tuned mass 926. The tuned mass Fourier analyzer 966 is configured to perform a Fourier analysis on the motion signal and output a frequency signal and an amplitude signal. The frequency signal is output to the frequency comparator 970 and the amplitude signal is output to the amplitude comparator 972. The frequency signal is representative of the immediate frequency of the first mode of vibration of the tuned mass 926, i.e. the first or lowest harmonic of the vibration. Whereas, the amplitude signal is representative of the immediate value of maximum amplitude of the first mode of vibration of the tuned mass 976, i.e. the first or lowest harmonic of the vibration.

The frequency comparator 970 is communicatively coupled to the base Fourier analyzer 964 and the tuned mass Fourier analyzer 966. The frequency comparator 970 comparator is further communicatively coupled to the tuning analyzer 974 and the central processor 980. The frequency comparator 970 receives the frequency signals from the Fourier analyzers 964, 966 and compares the frequency signals. If the frequency signals are different, the frequency comparator 970 outputs a frequency difference signal that is representative of the difference in frequency to the tuning analyzer 974. If the frequencies signals are the same, the frequency comparator 970 outputs a frequency match signal to the central processor 980. Thus, either the tuning analyzer 974 or the central processor 980 receives a signal from the frequency comparator 970 and is operated accordingly. Therefore, the tuning analyzer 974 and the central processor 980 do not send commands to the actuators 976, 978 simultaneously The amplitude comparator 972 is communicatively coupled to the base Fourier analyzer 964 and the tuned mass Fourier analyzer 966. The amplitude comparator 972 is further communicatively coupled to the central processor 980. The amplitude comparator 972 receives the amplitude signals from the Fourier analyzers 964, 966, compares the amplitude signals and outputs a displacement signal that is representative of the relative displacement of the tuned mass 926 from the casing 924. The displacement signal is output to the central processor 980.

The tuning analyzer 974 is communicatively coupled to the frequency comparator 970 and the biasing member actuator 976. The tuning analyzer 974 receives the frequency difference signal from the frequency comparator 970. The tuning analyzer 974 is configured to analyze the frequency difference signal and output a biasing member tuning signal for adjusting the electromagnetic stiffness coefficient of the adjustable biasing member 940, to keep the frequency of vibration of the tuned mass 926 the same as the frequency of vibration of the object 922 and casing 924. The biasing member tuning signal is output to the biasing member actuator 976.

The biasing member actuator 976 is communicatively coupled to the tuning analyzer 974 and is electrically coupled to the adjustable biasing member 940, via contacts 982. As will be appreciated, the electrical connections between the contacts 982 and the adjustable biasing member 940 are omitted in FIG. 12. The biasing member actuator 976 receives the biasing member tuning signal from the tuning analyzer 974 and activates the coils within the biasing member 940 based on the biasing member tuning signal to adjust the electromagnetic stiffness coefficient of the adjustable biasing member 940. As will be appreciated, tuning the electromagnetic stiffness coefficient of the adjustable biasing member 940 can help to keep the frequency of vibration of the tuned mass 926 at a favorable level, i.e. the same as the frequency of vibration of the object 922 and/or casing 924.

The central processor 980 is communicatively coupled to the frequency comparator 970, the amplitude comparator 972, the beam Fourier analyzer 968 and the drive mechanism actuator 978. The central processor 980 receives the frequency match signal from the frequency comparator 670, the displacement signal from the amplitude comparator 672 and the frequency and amplitude signals from the beam Fourier analyzer 968. The central processor 980 is configured to analyze the received signals and output a drive tuning signal to the drive mechanism actuator 978, to maintain parametric resonance by keeping the frequency of vibration $\omega_0$ of the tuned mass equal to $2\omega_N/n$, where n=1, 2, 3 . . . and where $\omega_N$ is the natural frequency of vibration one of the magnets 928 attached to the corresponding cantilever beam 988, as set out above.

The beam Fourier analyzer 968 is communicatively coupled to the sensors 936 on the cantilever beams 988 and is further communicatively coupled to the central processor 980. The beam Fourier analyzer 968 receives a motion signal from each of the sensors 936 that is representative of the vibration motion of a corresponding one of the cantilever beams 988. The beam Fourier analyzer 968 is configured to perform a Fourier analysis on the motion signals and output a frequency signal and an amplitude signal to the central processor 980. The frequency signal is representative of the immediate frequency of the first mode of vibration of the cantilever beams 988, i.e. the first or lowest harmonic of the vibration. The amplitude signal is representative of the immediate value of maximum amplitude of the first mode of vibration of the cantilever beams 988, i.e. the first or lowest harmonic of the vibration. In this embodiment, the frequency signal and the amplitude signal are mean values for the motion of both cantilever beams 988. In other embodiments, the Fourier analyzer 928 may output a plurality of frequency signals and a plurality of amplitude signals, with each signal representing the vibration motion of one of the cantilever beams 988.

The drive mechanism actuator 978 is communicatively coupled to the central processor 980 and to the drive mechanisms 977. The drive mechanism actuator 978 receives the drive tuning signal from the central processor 980 and activates the drive mechanisms 994 to reposition the clamps 992 within the slots 990 based on the drive tuning signal. As will be appreciated, repositioning the clamps 992 within the slots 990 can help to maintain parametric resonance of the magnets 928 within the VEHD 920, as described above. Maintaining parametric resonance can help to increase the amplitude of vibration of the magnets 928 within the coils 930 and, accordingly, can help to increase the amount of electrical energy generated by the VEHD 920.

FIG. 13 shows another embodiment of a VEHD generally identified by reference character 1020. This VEHD 1020 is applicable for a large-scale object, such as towers, bridges, ships, etc. However, it will be appreciated that the VEHD 1020 may be used in other applications as well. The VEHD 1020 is configured to provide both vibration damping and energy harvesting, over a broad range of frequencies. The VEHD 1020 is attached to a vibrating object 1022 and comprises a casing 1024, a tuned mass 1026, a magnet 1028, a coil 1030, a plurality of biasing assemblies 1032, a guide 1034, a fluid filler 1056 and a fluid volume meter 1058. The tuned mass 1026 and the magnet 1028 are retained within the casing 1024, with the magnet 1028 retained within the tuned mass 1026, and are movable in a rectilinear direction, along the guide 1034. The plurality of biasing assemblies 1032 are connected between the casing 1024, the tuned mass 1026 and the magnet 1028 and vibrationally couple the connected elements, such that the vibration of each one of the connected elements influences the vibration of the other connected elements. The coil 1030 surrounds the magnet 1028 and is secured to the tuned mass 1026, for example by being embedded in the tuned mass 1026. As will be appreciated, the tuned mass 1026, the magnet 1028 and the plurality of biasing assemblies 1032 generally form a vibration damper in the VEHD 1020, while the magnet 1028 and the coil 1030 generally form an energy harvester. The VEHD 1020 further comprises a plurality of sensors 1036.

The casing 1024 is configured to retain the various components of the VEHD 1020 and is configured to securely attach to the vibrating object 1022. The casing 2010 vibrates when an external force is applied to the object 1022. The casing 1024 is formed of a non-magnetic material, such as non-magnetic metal, plastic or other suitable material. The casing 1024 may be cylindrically shaped or may be another suitable shape, as will be appreciated. Although a casing 1024 is shown and described herein, it will be appreciated by those skilled in the art that other suitable support structures may be used, such as a frame.

The tuned mass 1026 is configured to provide vibration damping to the object 1022 and to amplify the vibrations of the magnet 1028 within the coil 1030. The tuned mass 1026 is constrained to move in the rectilinear direction (i.e. in a single direction, such as the vertical direction in FIG. 13) by the guide 1034. The tuned mass 1026 is at least partially hollow and has a variable mass that can be adjusted by the fluid filler 1056, as described below. In some embodiments, the tuned mass 1026 may include a hollow tank that can be filled by the fluid filler 1056 to adjust the mass of the tuned mass 1026. The mass of the tuned mass 1026 is sufficient to reduce undesired vibrations in the object 1022. The tuned mass 1026 is formed of a non-magnetic material, such as a non-magnetic metal, and may be cylindrically shaped or another suitable shape, as will be appreciated.

The magnet 1028 is configured to provide vibration damping to the object 1022 and is configured to generate a changing magnetic flux when vibrating within the VEHD 1020. The magnet 1028 is constrained to move in the rectilinear direction (e.g. the vertical direction in FIG. 13) by the guide 1024. The magnet 1028 is formed of a permanent magnetic material, such as an alloy of neodymium, and has sufficient magnetic field strength to induce a useful electrical current in the coil 1030. The magnet 1028 may be a single unitary magnet or may be an array of individual magnets.

The coil 1030 is configured to produce the useful electrical current when exposed to the changing magnetic flux generated by the magnet 1028. The coil 1030 is embedded or otherwise secured within the tuned mass 1026 in a position surrounding the magnet 1028 and terminates in a pair of electrical contacts (not shown in FIG. 13), which may be connected to the power system or other electrical load. The coil 1030 comprises a number of turns for generating the useful electrical current when exposed to the changing magnetic flux. The coil 1030 is formed of an electrically conductive material, such as copper wire, which may be coated to prevent short circuiting of the coil 1030.

The plurality of biasing assemblies 1032 is configured to bias the tuned mass 1026 and the magnet 1028 towards respective neutral positions (i.e. their positions before vibrating) within the casing 1024 and the tuned mass 1026, respectively. Each of the biasing assemblies 1032 is the same as the biasing assemblies 232, described above. Accordingly, each of the biasing assemblies 1032 comprises a fixed biasing member 1038 and an adjustable biasing member 1040, which are arranged in parallel and are the same as the fixed biasing member 238 and the adjustable biasing member 240, described above. The plurality of biasing assemblies 1032 comprises a first biasing assembly 1032a, which is connected between the casing 1024 and the tuned mass 1026, and a second biasing assembly 1032b, which is connected between the tuned mass 1026 and the magnet 1028.

The guide 1034 is configured to constrain the movement of the tuned mass 1026 and the magnet 1028 to a rectilinear direction (e.g. the vertical direction in FIG. 13). Accordingly, the guide 1034 is secured within the casing 1024 and extends between a first side of the casing 1024 proximal to the object 1022 and a second side of the casing 1024, opposite the first side and distal from the object 1022. The guide 1034 comprises an elongate rod, which passes through corresponding voids (not shown) in the tuned mass 1026 and the magnet 1028. Although, other suitable constructions for the guide 1034 will be apparent to those skilled in the art.

The fluid filler 1056 is configured to adjust the mass of the tuned mass 1026. The fluid filler 1056 is operable to add or remove fluid from within the tuned mass 1026 (such as within a tank secured to the tuned mass 1026 or within a void within the tuned mass 1026 itself) to increase or decrease the mass of the tuned mass 1026. The fluid filler 1056 comprises a pump or other fluid motivator suitable for adding and removing the fluid, as will be appreciated by a person skilled in the art. The fluid may be supplied from a fluid supply outside of the VEHD 1020, not shown in FIG. 13.

The fluid meter 1058 is configured to measure the volume of fluid within the tuned mass 1026 and is communicatively coupled to a control system (not shown in FIG. 13). The fluid meter 1058 measures the volume of the fluid within the tuned mass 1026 and outputs a signal representative of that volume to the control system.

The plurality of sensors 1036 is configured to detect the position, velocity and/or acceleration of the various elements of the VEHD 1020. The plurality of sensors 1036 comprises a first sensor 1036a secured to the casing 1024 and/or the object 1022, a second sensor 1036b secured to the tuned mass 1026 and a third sensor 1036c secured to the magnet 1028. Each of the sensors 1036 is configured to output a motion signal that is representative of the vibrational motion of the element to which the sensor 1036 is secured. In this embodiment, the sensors 1036 are accelerometers. Alternatively, the sensors 1036 may be position sensors, velocity sensors, or other motion sensors. Each of the sensors 1036 is communicatively coupled to the control system for the VEHD 1020 (not shown in FIG. 13).

The control system receives the signal from the fluid meter 1058 and the plurality of sensors 1036 and operates the fluid filler 1046 to either increase or decrease the mass of the tuned mass 1026. The control system also operates the adjustable biasing assemblies 1032 to increase or decrease the combined stiffness coefficient thereof, as described above. In some embodiments, the control system may operate the adjustable biasing assemblies 1032 to achieve a desired performance and may only operate the fluid meter 1058 if the desired performance cannot be achieved by operating the adjustable biasing assemblies alone 1032. Accordingly, the VEHD 1020 can be adjusted to tune the performance of the VEHD 1020, which can help to optimize the vibration damping and the energy harvesting provided by the VEHD 1020, over a broad range of frequencies.

Although the adjustable biasing members have been shown and described above as comprising a first electromagnetic arrangement, which is configured to increase the electromagnetic stiffness of the adjustable biasing member, and a second electromagnetic arrangement, which is configured to decrease the electromagnetic stiffness of the adjustable biasing member, in other embodiments the adjustable biasing member may comprise a single electromagnetic arrangement that is reconfigurable between the first electromagnetic arrangement and the second electromagnetic arrangement. This reconfigurable electromagnetic arrangement may comprise an actuator that repositions the permanent magnets from being horizontally aligned with opposite poles facing each other (similar to the first electromagnetic arrangement, described above) to being vertically aligned with the same poles facing each other (similar to the second electromagnetic arrangement, described above). The coils may be repositioned along with the permanent magnets. This repositioning may be done by rotating the permanent magnets and the surrounding coils in the electromagnetic arrangement. Accordingly, this single reconfigurable electromagnetic arrangement may be used to either increase or decrease the electromagnetic stiffness coefficient of the adjustable biasing member, as required.

Although the fixed biasing member in the adjustable biasing assembly has been shown and described above as a mechanical, hydraulic and/or pneumatic spring, in other embodiments the fixed biasing member may comprise a coil spring, a clamped flat bar, a cantilever beam, or other suitable biasing member.

Although the guide has been shown and described above as comprising a single rod, a person skilled in the art will appreciate that in other embodiments the guide may comprise one or more rods or rails extending within the casing. In yet other embodiments, the guide may comprises the inner surface of the casing itself and the VEHD may not include a rod or rail therein. In some embodiments, the guide may be omitted entirely.

Although the control systems and power systems are shown and described above as separate from the VEHD, in other embodiments the control system and/or the power system may be integrated into the VEHD. In some embodiments, the power system may be used to provide electrical energy to elements in the control system, such as the central processor, the Fourier analyzers, the comparators and/or other elements of the control system.

Although embodiments have been described above and are shown in the accompanying drawings, it will be appreciated by those skilled in the art that variations and modifications may be made without departing from the scope thereof as defined by the appended claims, and the scope of the claims should be given the broadest interpretation consistent with the specification as a whole.

What is claimed is:

1. A vibration energy harvesting damper (VEHD) comprising:
   a support structure that is securable to a vibrating object;
   a tuned mass retained by the support structure and movable in a rectilinear direction;
   a magnet vibrationally coupled to and spaced apart from the tuned mass;
   a coil surrounding the magnet; and
   at least one biasing assembly connecting two or more of the support structure, the tuned mass and the magnet, the at least one biasing assembly comprising a fixed biasing member and an adjustable biasing member arranged in parallel, wherein the adjustable biasing member is configured to adjust a combined stiffness coefficient of the biasing assembly.

2. The VEHD of claim 1, wherein the adjustable biasing member is operable in a first mode to increase the combined stiffness coefficient of the biasing assembly and is operable in a second mode to decrease the combined stiffness coefficient of the biasing assembly.

3. The VEHD of claim 1, wherein the adjustable biasing member comprises a first electromagnetic arrangement configured to increase the combined stiffness coefficient of the biasing assembly and a second electromagnetic arrangement configured to decrease the combined stiffness coefficient of the biasing assembly.

4. The VEHD of claim 3, wherein the first electromagnetic arrangement comprises:
   a first pair of permanent magnets aligned with opposite poles facing each other and oriented generally perpendicular to the rectilinear direction; and
   a first pair of coils surrounding the first pair of permanent magnets,
   wherein the first pair of coils are configured to be selectively energized to adjust a gap between the first pair of permanent magnets to increase the combined stiffness coefficient of the biasing assembly.

5. The VEHD of claim 4, wherein the second electromagnetic arrangement comprises:
   a second pair of permanent magnets aligned with the same poles facing each other and oriented generally in the rectilinear direction; and
   a second pair of coils surrounding the second pair of permanent magnets,
   wherein the second pair of coils are configured to be selectively energized to adjust a gap between the second pair of permanent magnets to decrease the combined stiffness coefficient of the biasing assembly.

6. The VEHD of claim 1, wherein the adjustable biasing member comprises a single electromagnetic arrangement having a pair of permanent magnets and a pair of coils that surround the pair of permanent magnets and are configured to be selectively energized to adjust a gap between the pair of permanent magnets,
   wherein the pair of permanent magnets and the pair of coils are rotatable between a first configuration, where the pair of permanent magnets are aligned with opposite poles facing each other and are oriented generally perpendicular to the rectilinear direction, and a second configuration, where the pair of permanent magnets are aligned with the same poles facing each other and are oriented generally in the rectilinear direction,
   wherein the single electromagnetic arrangement is configured to increase the combined stiffness coefficient of the biasing assembly when in the first configuration, and
   wherein the single electromagnetic arrangement is configured to decrease the combined stiffness coefficient of the biasing assembly when in the second configuration.

7. The VEHD of claim 1, wherein the at least one biasing assembly comprises a first biasing assembly connected between the support structure and the tuned mass, a second biasing assembly connected between the tuned mass and the magnet, and a third biasing assembly connected between the magnet and the support structure.

8. The VEHD of claim 1, wherein the at least one biasing assembly further comprises a friction reduction unit arranged in series with the fixed biasing member, the friction reduction unit comprising a resistor-inductor-capacitor circuit in series with a device having a falling volt-amp characteristic.

9. The VEHD of claim 1, wherein the magnet and the coil are a first magnet and a first coil, wherein the VEHD further comprises a second magnet and a second coil that are arranged in parallel with the first magnet and the first coil, wherein the second magnet is vibrationally coupled to and spaced apart from the tuned mass, and wherein the second coil surrounds the second magnet.

10. The VEHD of claim 9, wherein the at least one biasing assembly comprises a first biasing assembly connected between the support structure and the tuned mass, a second biasing assembly connected between the tuned mass and the first magnet, a third biasing assembly connected between the first magnet and the support structure, a fourth biasing assembly connected between the tuned mass and the second magnet, and a fifth biasing assembly connected between the second magnet and the support structure.

11. The VEHD of claim 1, wherein the magnet comprises an array of magnets and the coil comprise an array of coils and wherein each of the magnets in the array of magnets is surrounded by at least one of the coils in the array of coils.

12. The VEHD of claim 11, further comprising at least one inter-magnet cushion positioned between adjacent magnets in the array of magnets.

13. The VEHD of claim 1, wherein the at least one biasing assembly is connected between the support structure and the magnet, wherein the VEHD further comprises at least one fixed biasing member connected between the magnet and the tuned mass, and wherein the VEHD further comprises a vibro-impact assembly that includes the tuned mass and a container, with the container secured to the support structure and the tuned mass positioned within the container.

14. The VEHD of claim 13, wherein the vibro-impact assembly further includes an amplitude tuner and a density regulator, wherein the amplitude tuner is positioned at least partially within the container and is configured to adjust a maximum amplitude with which the tuned mass can vibrate within the container, and wherein the density regulator is configured to adjust the density of fluid in the container.

15. The VEHD of claim 1, wherein the tuned mass comprises a pair of tuned masses, wherein the magnet comprises a pair of magnets, wherein the VEHD further comprises a pair of vibro-impact assemblies, and wherein each of the vibro-impact assemblies includes one of the tuned masses and a container, with the container secured to the support structure and the one of the tuned masses positioned within the container.

16. The VEHD of claim 15, wherein the at least one biasing assembly comprises a pair of the biasing assemblies and wherein each of the biasing assemblies is connected between a corresponding one of the magnets and one of the vibro-impact assemblies, with the fixed biasing member connected between the corresponding magnet and the tuned mass of the corresponding vibro-impact assembly, and with the adjustable biasing member connected between the corresponding magnet and the container of the corresponding vibro-impact assembly.

17. The VEHD of claim 1, wherein the at least one biasing assembly is connected between the support structure and the tuned mass, wherein the magnet comprises a pair of magnets that are aligned with the same poles facing each other and are configured to move oppositely in a generally transverse direction to the rectilinear direction, wherein the coil comprises a pair of coils and each of the coils surrounds one of the magnets, wherein the tuned mass includes a pair of slots, wherein the VEHD further comprises a pair of cantilever beams with each of the cantilever beams extending through one of the slots and being connected between the support structure and one of the magnets, and wherein the tuned mass is configured to slidingly engage the cantilever beams to increase the amplitude of vibration of the magnets via parametric resonance.

18. The VEHD of claim 17, wherein the tuned mass includes at least one clamp within each of the slots that slidingly engages the cantilever beam and is movable within the slot to adjust a free length of the cantilever beam.

19. The VEHD of claim 1, wherein the at least one biasing assembly comprises a first biasing assembly connected between the support structure and the tuned mass and a second biasing assembly connected between the tuned mass and the magnet, wherein the magnet is retained within the tuned mass and the coil is secured to the tuned mass in a position surrounding the magnet, wherein the tuned mass is at least partially hollow, and wherein the VEHD further comprises a fluid filler that is configured to adjust the mass of the tuned mass by adding or removing fluid from the hollow of the tuned mass.

20. The VEHD of claim 1, wherein the VEHD further comprises a plurality of sensors and a control system, the plurality of sensors being configured to measure the vibration of the support structure, the tuned mass and the magnet, and the control system being configured to receive the measured vibrations and adjust the combined stiffness coefficient of the at least one biasing assembly.

21. A method for adjusting a vibration energy harvesting damper (VEHD) having a support structure, a tuned mass, a magnet and at least one biasing assembly that includes a fixed biasing member and an adjustable biasing member arranged in parallel, the method comprising:
  measuring the vibration of at least one of the support structure, the tuned mass and the magnet;
  comparing at least one of a frequency, an amplitude and a phase of the measured vibration to at least one of a previously measured frequency, a previously measured amplitude and a previously measured phase to determine a change in at least one of the frequency, the amplitude and the phase of the vibration;
  analyzing the change in the at least one of the frequency, the amplitude and the phase of the vibration to generate a tuning signal for adjusting an electromagnetic stiffness coefficient of the adjustable biasing member; and
  actuating the adjustable biasing member based on the tuning signal to adjust the electromagnetic stiffness coefficient of the adjustable biasing member and thereby adjust a combined stiffness coefficient of the biasing assembly.

22. An array of vibration energy harvesting dampers (VEHDs) in accordance with claim 1 and connected to an object, each of the VEHDs being configured to reduce an amplitude of vibration of the object in a different respective direction.

* * * * *